US008818997B2

(12) United States Patent
Matsumoto et al.

(10) Patent No.: US 8,818,997 B2
(45) Date of Patent: Aug. 26, 2014

(54) INFORMATION PROCESSING METHOD, INFORMATION PROCESSING APPARATUS, AND STORAGE MEDIUM WITH RECORDED INFORMATION PROCESSING PROGRAM

(75) Inventors: Tatsuro Matsumoto, Kawasaki (JP); Masayuki Fukui, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 692 days.

(21) Appl. No.: 12/192,567

(22) Filed: Aug. 15, 2008

(65) Prior Publication Data

US 2009/0044623 A1 Feb. 19, 2009

(30) Foreign Application Priority Data

Aug. 17, 2007 (JP) ................................ 2007-212876

(51) Int. Cl.
*G06F 17/30* (2006.01)

(52) U.S. Cl.
USPC ............................ 707/723; 707/748; 707/770

(58) Field of Classification Search
USPC ................................. 707/760, 723, 748, 770
See application file for complete search history.

(56) References Cited

U.S. PATENT DOCUMENTS

| | | | | |
|---|---|---|---|---|
| 5,742,745 | A * | 4/1998 | Sugikawa et al. | 358/1.15 |
| 7,865,489 | B2 * | 1/2011 | Bhide et al. | 707/705 |
| 7,970,609 | B2 * | 6/2011 | Hayakawa | 704/238 |
| 2002/0059190 | A1 * | 5/2002 | Ishizaki | 707/2 |
| 2003/0037041 | A1 * | 2/2003 | Hertz | 707/1 |
| 2004/0073687 | A1 | 4/2004 | Murata | |
| 2004/0148280 | A1 * | 7/2004 | Chimura | 707/3 |
| 2004/0216047 | A1 * | 10/2004 | Iwata | 715/530 |
| 2005/0027809 | A1 | 2/2005 | Wakabayashi | |
| 2006/0136206 | A1 * | 6/2006 | Ariu et al. | 704/246 |
| 2008/0071602 | A1 * | 3/2008 | Ojakaar et al. | 705/10 |
| 2008/0177794 | A1 * | 7/2008 | Spencer et al. | 707/104.1 |

FOREIGN PATENT DOCUMENTS

| | | |
|---|---|---|
| JP | 09-269938 | 10/1997 |
| JP | 2001-297098 | 10/2001 |
| JP | 2003-296341 | 10/2003 |
| JP | 2003-303186 | 10/2003 |
| JP | 2003-330916 | 11/2003 |
| JP | 2004-086694 | 3/2004 |
| JP | 2004-153398 | 5/2004 |
| JP | 2005-50221 | 2/2005 |
| JP | 2005-107749 | 4/2005 |
| JP | 2005-209020 | 8/2005 |
| JP | 2007-108971 | 4/2007 |

OTHER PUBLICATIONS

Japanese Patent Office Action mailed Jun. 5, 2012 for corresponding Japanese Patent Application No. 2007-212876.

* cited by examiner

*Primary Examiner* — Noosha Arjomandi
(74) *Attorney, Agent, or Firm* — Staas & Halsey LLP

(57) ABSTRACT

An information processing apparatus which can communicate with terminals, includes a terminal environment acquiring portion which acquires terminal environment information from a terminal intended to input transmission information, the terminal environment information is an information about an environment of the terminal; a keyword reading portion which reads a plurality of keywords from a keyword recording portion based on the terminal environment information acquired by the terminal environment acquiring portion, the keyword recording portion records associating keywords in transmission information which has been inputted through terminals with terminal environment information of the terminals through which the transmission information has been inputted; and a keyword presenting portion which presents the plurality of keywords read by the keyword reading portion as selection candidates to the terminal intended to input transmission information.

11 Claims, 21 Drawing Sheets

WORD-OF-MOUTH INFORMATION ENTRY SCREEN

☐ DATE AND TIME: 7/7 (SAT) 10:57:13

☐ POSITION: +34.64500, +134.99400

☐ TITLE:

INFORMATION NEARBY HYOGO PREFECTURE AKASHI CITY KAJIYA-CHO

☐ SCORE: ★★★★☆ ▽

☐ WHAT?: AKASHIYAKI ▽

☐ HOW WAS IT?: TASTEFUL ▽

☐ REMARKS:

I WENT BEFORE THE NOON, BUT THERE WAS A LINE IN FRONT OF THE SHOP.

TRANSMIT

WORD-OF-MOUTH INFORMATION ENTRY SCREEN

☐ DATE AND TIME: 7/7 (SAT) 10:57:13

☐ POSITION: +34.64500, +134.99400

☐ TITLE:

INFORMATION NEARBY HYOGO PREFECTURE AKASHI CITY KAJIYA-CHO

☐ SCORE: ★★★★☆ ▽

☐ WHAT?:

☐ HOW WAS IT?:

☐ REMARKS:

PLEASE MAKE A CHOICE

AKASHI
SOUP
FEELING
SAUCE
LINE
IN-STORE
OCTOPUS
TAKOYAKI

TRANSMIT

FIG. 4

| USER ID | DATE | TIME | LATITUDE | LONGITUDE | SCORE | TITLE | WHAT | HOW WAS IT | REMARKS |
|---|---|---|---|---|---|---|---|---|---|
| 001 | 2006/09/24 | 17:05:02 | 34.6436 | 134.99251 | 3 | TO AWAJISHIMA | FERRY TERMINAL | ARRIVED | — |
| 004 | 2006/09/24 | 10:21:34 | 34.64224 | 134.99631 | 4 | HOT AKASHIYAKI | AKASHIYAKI | ATE | I MET AN INTERNET FRIEND COMING FROM SAITAMA (AT THE FIRST TIME) |
| 002 | 2006/12/15 | 7:26:00 | 34.64936 | 134.98804 | 3 | BREAKFAST | — | — | BREAKFAST IN HOTEL. BUFFET. I LET MYSELF EAT TOO MUCH. |
| 001 | 2007/04/08 | 12:35:00 | 34.65406 | 134.99107 | 5 | CHERRY TREES IN AKASHIJYO KOEN | CHEERY TREES | FULL BLOOM | CHERRY TREES THIS YEAR ARE ALSO BEAUTIFUL. THERE ARE MANY PEOPLE. |
| 003 | 2007/06/24 | 19:19:00 | 34.64739 | 134.99274 | 5 | URCHIN OF AWAJISHIMA | AWAJISHIMA | — | EATING NOW IN TOURIST HOME. THIS URCHIN IS A SUPERB PIECE OF WORK. |
| 002 | 2007/07/07 | 10:57:13 | 34.64500 | 134.99400 | 4 | INFORMATION NEARBY HYOGO PREFECTURE AKASHI CITY KAJIYA-CHO | AKASHIYAKI | TASTEFUL | I WENT BEFORE THE NOON, BUT THERE WAS A LINE IN FRONT OF THE SHOP |
| ... | ... | ... | ... | ... | ... | ... | ... | ... | ... |

FIG. 5

| LATITUDE | LONGITUDE | DATE | TIME | WHAT | HOW WAS IT |
|---|---|---|---|---|---|
| 34.64373 | 134.99841 | 2006/12/5 | 23:05:11 | AKASHI | WENT, BEAUTIFUL |
| 34.64527 | 134.99368 | 2006/12/20 | 13:10:45 | TAKOYAKI, SAUCE, OCTOPUS, LINE | ATE, TASTEFUL |
| 34.64595 | 134.99077 | 2007/1/8 | 17:20:56 | AKASHI | HOT, FUN |
| 34.64708 | 134.99104 | 2007/1/17 | 13:17:23 | AKASHIYAKI, SOUP | TASTELESS |
| 34.64715 | 134.99245 | 2007/3/28 | 11:49:48 | AKASHIYAKI | HOT, TASTEFUL |
| 34.64786 | 134.98825 | 2007/4/29 | 15:24:53 | AKASHI, TAMAGOYAKI | ATE, GORGED MYSELF |
| 34.64866 | 134.98413 | 2007/5/3 | 19:06:35 | AKASHI, CONGER, BREAM, SPECIALTY | ATE A LOT, HARD TO CHEW |
| 34.64868 | 134.99265 | 2007/5/30 | 12:30:56 | AKASHI, SOUP STOCK, TAKOYAKI | DIFFERENT, SOFT |
| 34.64873 | 134.99033 | 2007/6/21 | 09:32:12 | AKASHI, AKASHI-KAIKYO BRIDGE | CROSSED, LARGE |
| 34.64897 | 134.99319 | 2007/7/1 | 14:25:40 | AKASHI, THE MERIDIAN, ASTRONOMICAL OBSERVATORY, STANDARD TIME | WENT |
| 34.64500 | 134.99400 | 2007/7/7 | 10:57:13 | AKASHI, KAJIYA-CHO, AKASHIYAKI, LINE | WENT, IN THE FRONT OF THE SHOP |
| ... | ... | ... | ... | ... | ... |

FIG. 19

```
?<?xml version="1.0"encoding="utf-8"?>
<restaurant information>
  <Item>
    <restaurant name>○○○</restaurant name>
    <Url>http://www.restrant-kuchikomi.com/13283429/</Url>
    <score>4.05</score>
    <price>MORE THAN 500 YEN</price>
    <category>AKASHIYAKI</category>
    <nearest station>AKASHI</nearest station>
    <address>XX-XX,XXXX-CHO,AKASHI CITY</address>
    <phone>XXX-XXX-XXXX</phone>
    <open time>11:00-22:00</open time>
    <regular holiday>EVERY MONDAY, ONE TUESDAY IN MONTH</regular
    holiday>
    <latitude>34.6452698700187</latitude>
    <longitude>134.993692545589</longitude>
    <word-of-mouth information>
      <word-of-mouth>
       <date and time>2007/7/9,21:24</date and time>
       <nickname>GONBEI</nickname>
       <comment>ALTHOUGH IT IS A SUPER FAMOUS RESTAURANT FOR
       AKASHIYAKI, THE DISH IS LESS TASTY THAN BEFORE.</comment>
       <score>3</score>
      </word-of-mouth>
      <word-of-mouth>
       <date and time>2007/7/1,23:18</date and time>
       <nickname>KANSAI-DAISUKI</nickname>
       <comment>I CAME FROM TOKYO TO EAT IT.IT WAS VERY TASTY AS
       THE REPUTATION SUGGESTED.  I WILL COME HERE AGAIN.
       </comment>
       <score>5</score>
      </word-of-mouth>
    </word-of-mouth information>
    </Item>
</restaurant information>
```

INFORMATION PROCESSING METHOD, INFORMATION PROCESSING APPARATUS, AND STORAGE MEDIUM WITH RECORDED INFORMATION PROCESSING PROGRAM

CROSS-REFERENCE TO RELATED APPLICATIONS

This application is related to and claims priority to f Japanese Patent Application No. 2007-212876, filed on Aug. 17, 2007, the entire contents of which are incorporated herein by reference.

BACKGROUND

1. Field

The embodiments discussed herein are directed to an information processing method, an information processing apparatus and an information processing program by which communication can be made with a plurality of terminals through a network.

2. Description of the Related Art

CGM (Consumer Generated Media) such as word-of-mouth sites, Q&A communities, social networking services (SNS), blogs and COI sites have become popular with the advance of Internet-related technique in recent years. Word-of-mouth information is put in the CGM due to user's direct contribution of information on the Internet. That is, user's real experience and first-hand voice can be placed on the Internet. Since the free opinion of one user is placed thus as word-of-mouth information on the Internet, any other user can make a judgment based on the placed word-of-mouth information as to whether or not to buy a product at a store, whether or not to use a facility (a restaurant, a hotel, a hospital, etc.), or whether or not to participate in an event (a firework display, a festival, etc.).

On the other hand, a portable phone used in mobile environment in recent years is provided with not only a telephone function but also an Internet connection function to make it possible to browse Web sites and transmit/receive e-mails. Particularly, a portable phone has a digital camera function, an application software execution function, a GPS function, etc. with the rapid advance of use of the portable phone as an Internet terminal in recent years. The portable phone is evolving into a device which goes beyond the borders of an Internet terminal and which has functions of a portable information terminal (such as a Personal Digital Assistant (PDA)). The use of such a portable phone permits a user to place fresh word-of-mouth information on the Internet in real time any time and anywhere when, for example, the user has used a purchased product, the user has used a facility or the user has participated in an event.

When a user inputs word-of-mouth information by using a portable phone, character input made through the portable phone takes a great deal of time and labor to the user because of limitation in input keys compared with character input made through a personal computer. Particularly, when the user inputs a long sentence by using the portable phone, a bigger burden is imposed on the user. For this reason, in many cases, the user does not want to take time and labor to input word-of-mouth information.

In order to lighten such a burden on the user, the portable phone is generally provided with a predictive conversion function. Ordinarily, the portable phone provided with the predictive conversion function can display conversion candidates in order of frequent or recent use from characters inputted in the past when the user inputs only one character. However, when, for example, the user has used a facility located in a certain region, the portable phone cannot display words concerned with this region as conversion candidates. For this reason, a great deal of time and labor may be taken when the user wants to input word-of-mouth information concerned with the facility by using the portable phone. Specifically, when the user can understand representation (Kanji characters, etc.) of the facility from the facility name written on a signboard, etc. of the facility but does not know how to pronounce the facility name, it takes a great deal of time and labor for the user to input the facility name by using the portable phone.

Therefore, there has been known a method in which a plurality of region-specific word dictionaries having words recorded in accordance with regions respectively are provided in a server unit, a region-specific word dictionary corresponding to a current position of a user is selected from the plurality of region-specific word dictionaries, the selected region-specific word dictionary is downloaded from the server unit to a portable phone, words predicted based on a character inputted by the user are retrieved from the downloaded region-specific word dictionary, and the retrieved words are displayed as high-ranking conversion candidates. Thus, it is possible to reduce time and labor for inputting word-of-mouth information concerned with the facility.

In the related-art method, however, for example, keywords included in transmission information (word-of-mouth information) becoming a topic of conversation currently in a certain region could not be displayed as conversion candidates on the portable phone because words of region-specific proper nouns were fixedly recorded in each region-specific word dictionary.

In the aforementioned related-art method, a Kana-to-Kanji conversion engine needs to be installed in the portable phone so that words recorded in a region-specific word dictionary can be displayed as high-ranking conversion candidates. Further, the portable phone needs to have a mechanism for downloading a region-specific word dictionary from the server unit to the portable phone and recording the downloaded region-specific word dictionary on the portable phone. For this reason, the aforementioned related-art method could not be achieved by any ordinary portable phone.

SUMMARY

It is an aspect of the embodiments discussed herein to provide an information processing method, an information processing apparatus and an information processing program by which keywords extracted from transmission information are recorded onto a keyword recording portion so that even an ordinary terminal can present, as selection candidates, a plurality of keywords acquired from the keyword recording portion, for example, based on the current position of the terminal.

The above aspects can be attained by a information processing method executed by a computer which can communicate with terminals, the information processing method includes a terminal environment information acquiring portion acquiring terminal environment information from a terminal intended to input transmission information, the terminal environment information is an information about an environment of the terminal; a keyword reading portion reading a plurality of keywords from a keyword recording portion based on the terminal environment information acquired in the terminal environment acquiring operation, the keyword recording portion records associating keywords in transmission information which has been inputted through terminals with terminal environment information of the terminals through which the transmission information has been inputted; and a keyword presenting portion presenting the plurality of keywords read in the keyword reading operation as selection candidates to the terminal intended to input transmission information.

The above aspects can be attained by an information processing apparatus which can communicate with terminals, includes a terminal environment acquiring portion which acquires terminal environment information from a terminal intended to input transmission information, the terminal environment information is an information about an environment of the terminal; a keyword reading portion which reads a plurality of keywords from a keyword recording portion based on the terminal environment information acquired by the terminal environment acquiring portion, the keyword recording portion records associating keywords in transmission information which has been inputted through terminals with terminal environment information of the terminals through which the transmission information has been inputted; and a keyword presenting portion which presents the plurality of keywords read by the keyword reading portion as selection candidates to the terminal intended to input transmission information.

The above aspects can be attained by a recording medium having an information processing program recorded thereon so that processing written in the information processing program is executed by a computer communicable with terminals, includes a terminal environment acquiring process for acquiring terminal environment information from a terminal intended to input transmission information, the terminal environment information is an information about an environment of the terminal; a keyword reading process for reading a plurality of keywords from a keyword recording portion based on the terminal environment information acquired by the terminal environment acquiring process, the keyword recording portion records associating keywords in transmission information which has been inputted through terminals with terminal environment information of the terminals through which the transmission information has been inputted; and a keyword presenting process for presenting the plurality of keywords read by the keyword reading process as selection candidates to the terminal intended to input transmission information.

These together with other aspects and advantages which will be subsequently apparent, reside in the details of construction and operation as more fully hereinafter described and claimed, reference being had to the accompanying drawings forming a part hereof wherein like numerals refer to like parts throughout.

BRIEF DESCRIPTION OF THE DRAWINGS

FIG. 4 illustrates an example of data recorded on a word-of-mouth information recording portion of an information processing apparatus in the communication system;

FIG. 5 illustrates an example of data recorded on a keyword recording portion of the information processing apparatus;

FIG. 19 illustrates the data structure of XML data recorded in a server unit in the communication system;

DETAILED DESCRIPTION OF THE EMBODIMENTS

Figure 1:
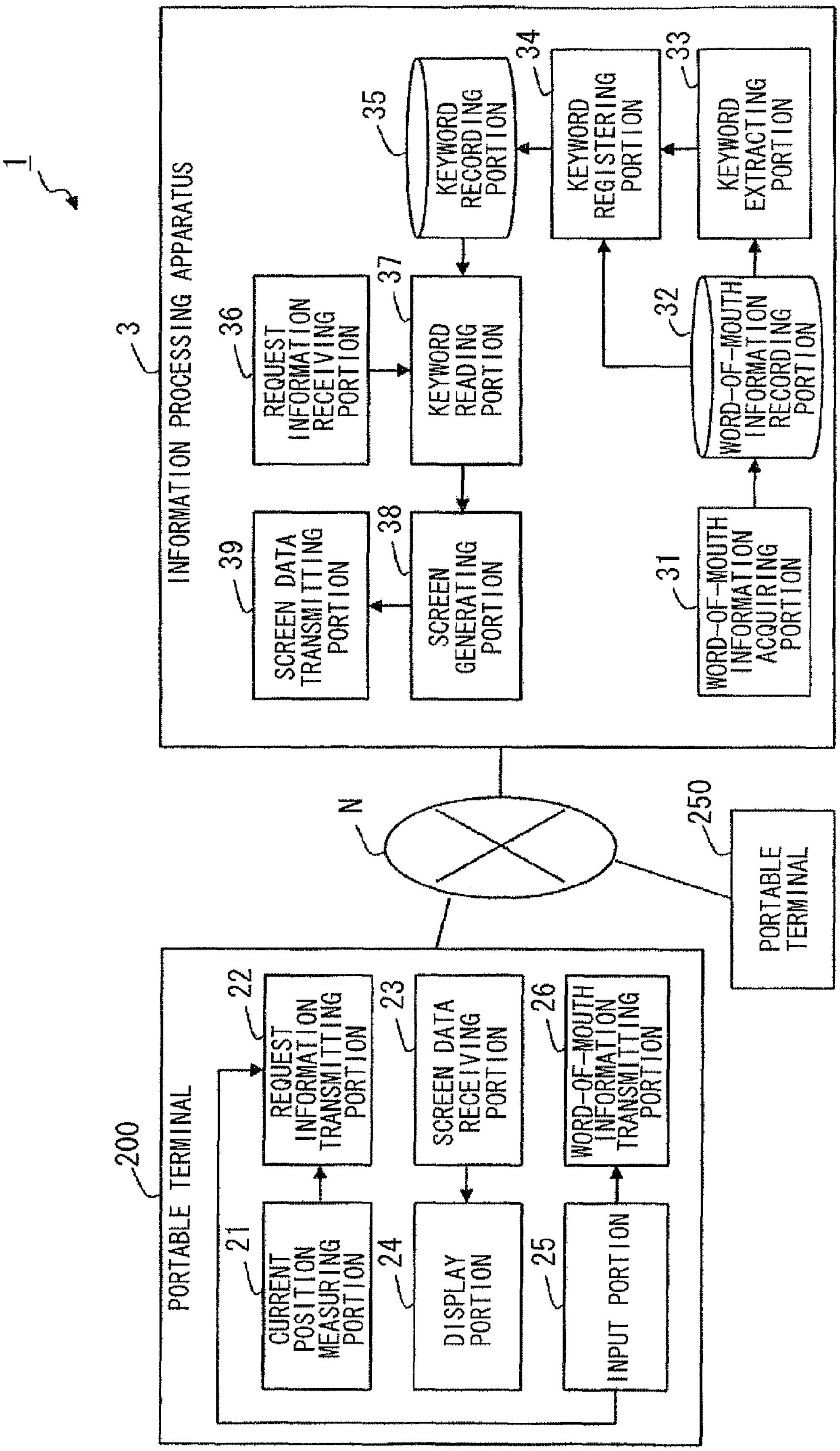
FIG. 1 illustrates a communication system according to a first example embodiment of the invention.

FIG. 1 illustrates the schematic configuration of a communication system 1. The communication system 1 includes portable terminals 200 and 250, and an information processing apparatus 3. The portable terminals 200 and 250 and the information processing apparatus 3 are connected to one another through a network N. Although the embodiment will be described in the case where the network N is the Internet by way of example, the kind of the network N is not limited particularly but may be an Ethernet (registered trademark), a wireless LAN, another computer network, or the like. Each of the portable terminals (terminals) 200 and 250 is a wirelessly communicable terminal such as a portable phone, a PHS (Personal Handyphone System) or a PDA (Personal Digital Assistant). The information processing apparatus 3 is an apparatus which collects word-of-mouth information (transmission information) inputted in the portable terminals 200 and 250 from the portable terminals 200 and 250 through the network N.

Although two portable terminals 200 and 250 and one information processing apparatus 3 are shown in FIG. 1 for the sake of simplification of description, the numbers of portable terminals 200 and 250 and information processing apparatuses 3 included in the communication system 1 are arbitrary. In addition, there may be other devices such as a user terminal, a Web server a proxy server, a DNS (Domain Name System) server and a DHCP (Dynamic Host Configuration Protocol) server on the communication system 1.

Incidentally, only in the case where members having the same function must be particularly distinguished from one another for description of the members, description will be made with an English lowercase character attached to each of the members for distinction, e.g. like portable terminal 200. In the case where members having the same function need not be particularly distinguished from one another or are named generically, description will be made with no English lowercase character attached to each of the members, e.g. like portable terminal 2.

The portable terminal 200 includes a current position measuring portion 21, a request information transmitting portion 22, a screen data receiving portion 23, a display portion 24, an input portion 25, and a word-of-mouth information transmitting portion 26. The configuration of the portable terminal 250 is the same as that of the portable terminal 200.

The current position measuring portion 21 measures the current position of the portable terminal 200. The current position measuring portion 21 is provided with a GPS (Global Positioning System) function, so that the current position measuring portion 21 receives radio waves transmitted from a plurality of geodetic earth orbiting satellites (GPS satellites) and measures the current position of the portable terminal 200 based on relative time differences among the received radio waves. Whenever the current position of the portable terminal 200 changes, the current position measuring portion 21 outputs position information expressing the current position of the portable terminal 200 to the request information transmitting portion 22. The position information contains a user ID for uniquely identifying the portable terminal 200, latitude information expressing the current latitude of the portable terminal 200, and longitude information expressing the current longitude of the portable terminal 200. Although description has been made above in the case where the current position measuring portion 21 is provided with a GPS function, the current position measuring portion 21 is not limited to this description. That is, the current position measuring portion 21 may measure the current position of the portable terminal 200 by acquiring position information from a nearby portable phone base station, a nearby wireless LAN access point, etc. with which the portable terminal 200 can communicate. Alternatively, the current position measuring portion 21 may measure the current position of the portable terminal 200 by acquiring position information from a road sign, a house-number sign, etc. That is, as long as the current position measuring portion 21 can measure the current position of the portable terminal 200, any of various methods can be used as the method for measuring the current position of the portable terminal 200.

Upon reception of an instruction from the input portion 25 to acquire a word-of-mouth information entry screen for inputting word-of-mouth information from the information processing apparatus 3, the request information transmitting portion 22 transmits request information expressing a request to acquire a word-of-mouth information entry screen, to the information processing apparatus 3 through the network N. The request information contains the position information outputted from the current position measuring portion 21, and time information expressing the current time.

The screen data receiving portion 23 receives screen data from the information processing apparatus 3 through the network N so that the screen data can be shown in the word-of-mouth information entry screen acquired from the information processing apparatus 3 based on the request information transmitted from the request information transmitting portion 22. The screen data receiving portion 23 outputs the received screen data to the display portion 24.

The display portion 24 displays the word-of-mouth information entry screen expressed by the screen data outputted from the screen data receiving portion 23. For this sake, the display portion 24 is includes any display device such as a liquid crystal display, an EL display, a plasma display or a CRT display.

The input portion 25 instructs the request information transmitting portion 22 to acquire the word-of-mouth information entry screen from the information processing apparatus 3 in accordance with an inputting operation of a user of the portable terminal 200. In addition, the input portion 25 enables the user of the portable terminal 200 to input word-of-mouth information in the word-of-mouth information entry screen displayed on the display portion 24. For this sake, the input portion 25 is includes any input device such as input keys, a touch panel, or a voice recognition unit.

Figure 2:
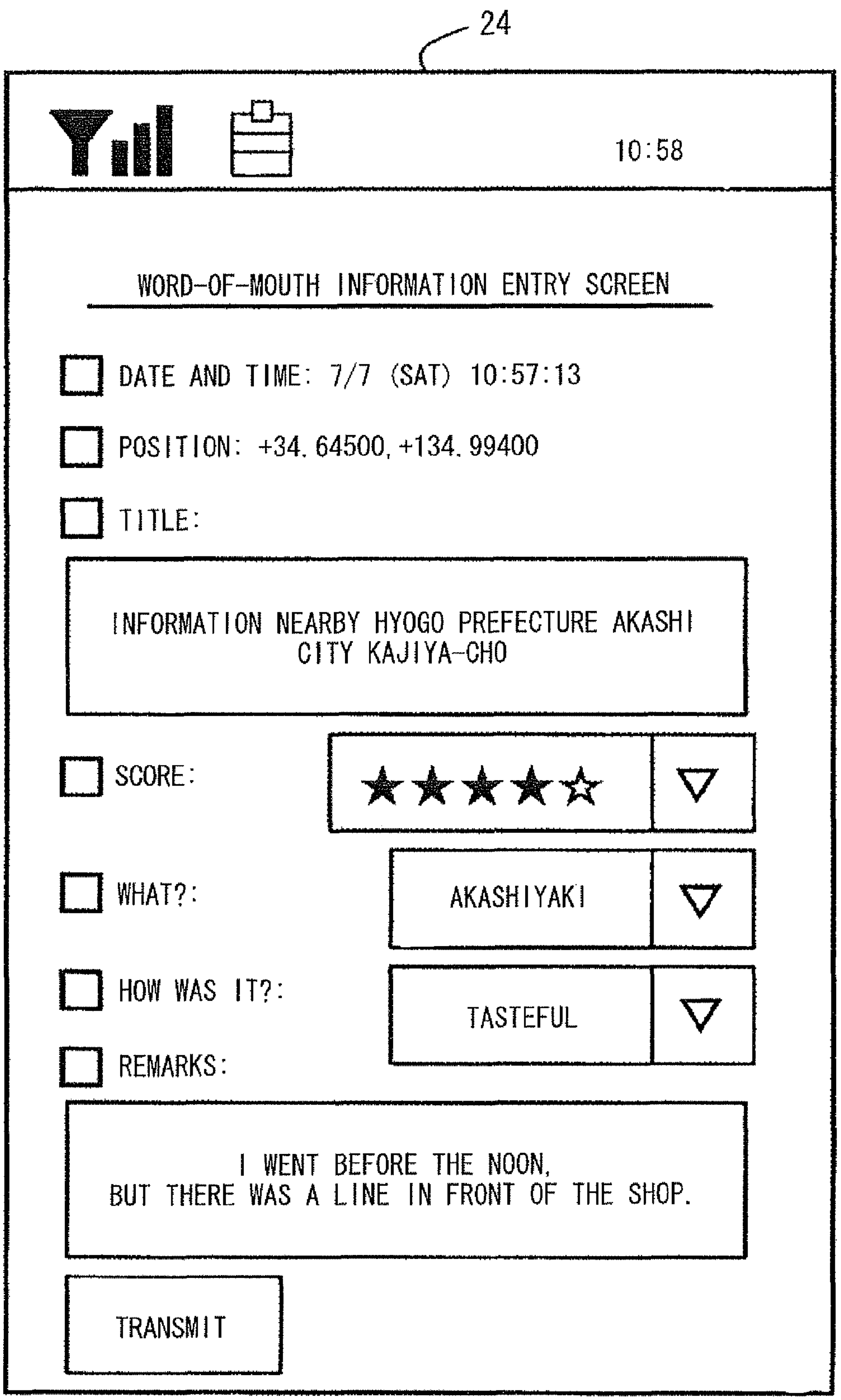
FIG. 2 illustrates a state where a user of a portable terminal has inputted word-of-mouth information in a word-of-mouth information entry screen displayed on a display portion of the portable terminal in the communication system.

FIG. 2 illustrates the state where the user of the portable terminal 200 has inputted word-of-mouth information in the word-of-mouth information entry screen displayed on the display portion 24. As shown in FIG. 2, "Date and Time" '7/7 (Sat) 10:57:13', "Position" '+34.64500, +134.99400' and "Title" 'Information nearby Hyogo Prefecture Akashi City Kajiya-Cho' are displayed in the word-of-mouth information entry screen on the display portion 24. Incidentally, "Position" is expressed in latitude information and longitude information. In addition, 'Information nearby Hyogo Prefecture Akashi City Kajiya-Cho' displayed in "Title" is entry information inputted as a default by the information processing apparatus 3. Incidentally, this entry information can be edited by the user of the portable terminal 200.

Figure 3:
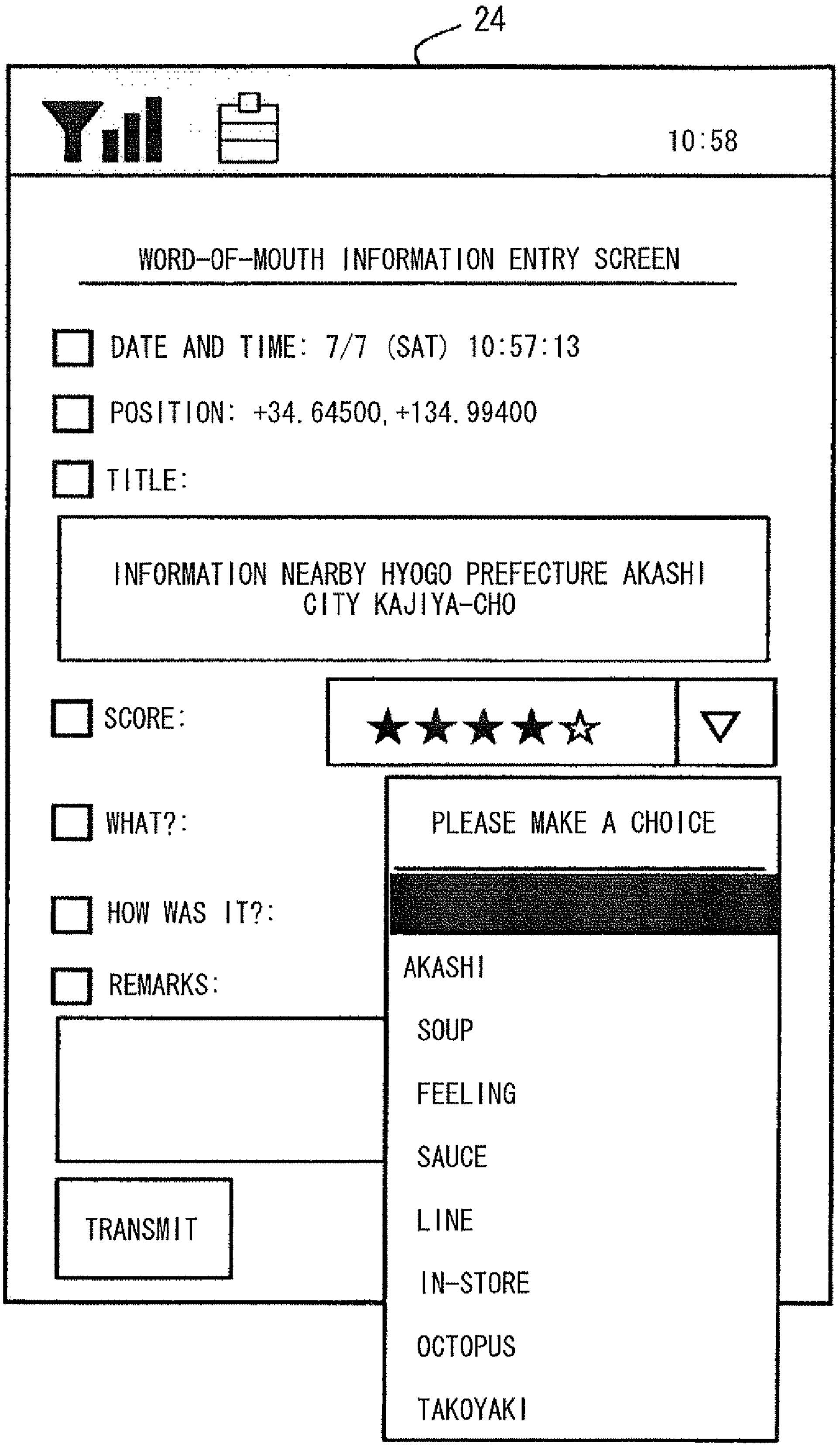
FIG. 3 illustrates a state where a selection field (pull-down menu) has been displayed in the word-of-mouth information entry screen.

In addition, "Score" '4' (four stars of five stars are selected in FIG. 2) is displayed on the display portion 24. In this embodiment, the score is expressed in five stages ranging from 1 to 5, in which 1 is the lowest score and 5 is the highest score. Moreover, "What?" 'Akashiyaki' and "How was it?" 'Tasteful' are displayed on the display portion 24. For example, as shown in FIG. 3, each of keywords ('Akashiyaki' and 'Tasteful') displayed in "What?" and "How was it?" is inputted as selection information in the portable terminal 200 in accordance with a selecting operation performed in a selection field (pull-down menu in the example shown in FIG. 3) by the user of the portable terminal 200. That is, when the user of the portable terminal 200 selects any keyword from a plurality of keywords, the keyword is inputted as selection information into the portable terminal 200. That is, the user of the portable terminal 200 can enter word-of-mouth information easily by a simple method of selecting any keyword from a plurality of keywords displayed as selection candidates. In addition, "Remarks" 'I went before the noon, but there was a line in front of the shop.' is displayed on the display portion 24. 'I went before the noon, but there was a line in front of the shop.' displayed in "Remarks" is entry information inputted by the user of the portable terminal 200. Further, a "Transmit" button is displayed on the display portion 24.

The word-of-mouth information transmitting portion 26 transmits the word-of-mouth information inputted in the portable terminal 200 to the information processing apparatus 3 through the network N. Specifically, in the case where the user of the portable terminal 200 has pushed the "Transmit" button after inputting the word-of-mouth information in the portable terminal 200, for example, as shown in FIG. 2, the word-of-mouth information inputted in the portable terminal 200 is transmitted to the information processing apparatus 3 through the network N by the word-of-mouth information transmitting portion 26.

The aforementioned portable terminal 200 can be also achieved by installation of a program into any computer such as a personal computer. That is, the current position measuring portion 21, the request information transmitting portion 22, the screen data receiving portion 23, the display portion 24, the input portion 25 and the word-of-mouth information transmitting portion 26 are embodied by a CPU of the computer which operates in accordance with the program for implementing these functions. Accordingly, the program for implementing these functions of the current position measuring portion 21, the request information transmitting portion 22, the screen data receiving portion 23, the display portion 24, the input portion 25 and the word-of-mouth information transmitting portion 26, or a recording medium having the program recorded thereon.

The information processing apparatus 3 includes a word-of-mouth information acquiring portion 31, a word-of-mouth information recording portion 32, a keyword extracting portion 33, a keyword registering portion 34, a keyword recording portion 35, a request information receiving portion 36, a keyword reading portion 37, a screen generating portion 38, and a screen data transmitting portion 39.

The word-of-mouth information acquiring portion (transmission information acquiring portion) 31 acquires word-of-mouth information transmitted from a portable terminal 2 through the network N. The word-of-mouth information acquiring portion 31 records the acquired word-of-mouth information onto the word-of-mouth information recording portion 32. FIG. 4 illustrates an example of data recorded on the word-of-mouth information recording portion 32. As shown in FIG. 4, "User ID", "Date", "Time", "Latitude", "Longitude", "Score", "Title", "What", "How was it", and "Remarks" are recorded on the word-of-mouth information recording portion 32. "User ID" is information for identifying the portable terminal 2 uniquely. "Date" and "Time" are time information corresponding to "Date and Time" shown in FIG. 2. "Latitude" and "Longitude" are position information corresponding to "Position" shown in FIG. 2. "Score" corresponds to "Score" shown in FIG. 2. "Title" and "Remarks" are entry information corresponding to "Title" and "Remarks" shown in FIG. 2. "What" and "How was it" are selection information corresponding to "What?" and "How was it?" shown in FIG. 2. Incidentally, '-' shown in FIG. 4 expresses that selection information or entry information was not inputted in the portable terminal 2 by a user of the portable terminal 2.

The keyword extracting portion 33 performs morphological analysis of the entry information recorded in "Title" and "Remarks" of the word-of-mouth information recording portion 32 to thereby divide the entry information into a plurality of words and extract keywords from the plurality of divided words in accordance with a predetermined standard. The keyword extracting portion 33 first reads the entry information recorded in "Title" and "Remarks" of the word-of-mouth information recording portion 32. The keyword extracting portion 33 performs morphological analysis of the entry information read from the word-of-mouth information recording portion 32. By the morphological analysis, the entry information is divided into a plurality of words. A part of speech of each of the divided words is discriminated. Although there are a Viterbi algorithm, a longest-match algorithm, etc. as examples of the method of morphological analysis, the method of morphological analysis used in the embodiment is not limited to a specific one. The keyword extracting portion 33 extracts keywords from the plurality of divided words in accordance with a predetermined standard. For example, the keyword extracting portion 33 extracts keywords serving as independent words from the plurality of divided words. Incidentally, each independent word is a part of speech which can compose a phrase by itself. For example, the independent words are nouns, verbs, adjectives, etc. The keyword extracting portion 33 first extracts keywords which are nouns in the independent words.

In addition, the keyword extracting portion 33 extracts each keyword as a noun from the divided words, and further extracts keywords which have modification relation with the extracted keyword. When, for example, the extracted keyword is "Takoyaki", the keyword extracting portion 33 further extracts keywords such as "ate" and "tasteful" which have modification relation with the extracted keyword "Takoyaki". For this reason, the keyword extracting portion 33 is provided with a function of analyzing modification relation. The keyword extracting portion 33 outputs the extracted keywords to the keyword registering portion 34.

Although description has been made above in the case where the keyword extracting portion 33 is provided with a function of analyzing modification relation, the keyword extracting portion 33 is not limited to this description. For example, the keyword extracting portion 33 may be provided in advance with a predicate dictionary not shown, so that the keyword extracting portion 33 can read keywords (predicates) having modification relation with a keyword as a noun, from the predicate dictionary. Incidentally, keywords as nouns, and attribute information (predicates) corresponding to the keywords are recorded on the predicate dictionary.

The keyword registering portion 34 records each keyword outputted from the keyword extracting portion 33 and position information and time type information corresponding to the keyword, onto the keyword recording portion 35. The keyword registering portion 34 first reads position information and time type information corresponding to entry information containing each keyword outputted from the keyword extracting portion 33, from the word-of-mouth information recording portion 32. The keyword registering portion 34 records the keyword outputted from the keyword extracting portion 33 and the position information and time type information read from the word-of-mouth information recording portion 32, onto the keyword recording portion 35 while associating the keyword with the position information and time type information. FIG. 5 illustrates an example of data recorded on the keyword recording portion 35. As shown in FIG. 5, "Latitude", "Longitude", "Date", "Time", "What", and "How was it" are recorded on the keyword recording portion 35. That is, the keyword registering portion 34 records each keyword having modification relation with the keyword recorded in "What", in "How was it". "Latitude" and "Longitude" can serve as position information. "Date" and "Time" can serve as time type information.

The request information receiving portion (terminal environment acquiring portion) 36 receives request information transmitted from the portable terminal 2 through the network N. The request information receiving portion 36 outputs position information contained in the received request information to the keyword reading portion 37 based on the received request information.

The keyword reading portion 37 reads keywords associated with position information in a predetermined distance range from the current position of the portable terminal 2 expressed by the position information outputted from the request information receiving portion 36, from the plurality of keywords recorded on the keyword recording portion 35. The predetermined distance range is recorded in advance as distance range information on a memory not shown but provided in the information processing apparatus 3. The keyword reading portion 37 judges whether or not the number of read keywords has reached a threshold. Assume that the threshold is "9" in the embodiment. When the keyword reading portion 37 makes a decision that the number of read keywords has reached the threshold, the keyword reading portion 37 further reads position information associated with each of the read keywords from the keyword recording portion 35.

On the other hand, when the keyword reading portion 37 makes a decision that the number of read keywords has not reached the threshold, the keyword reading portion 37 updates the distance range information recorded on the not-shown memory of the information processing apparatus 3 to widen the predetermined distance range. The keyword reading portion 37 reads keywords associated with position information in the predetermined distance range from the current position of the portable terminal 2 again, from the keywords recorded on the keyword recording portion 35 based on the updated distance range information. The keyword reading portion 37 updates the distance range information to widen the predetermined distance range until the number of read keywords reaches the threshold. The threshold is recorded in advance on the not-shown memory of the information processing apparatus 3. In this manner, keywords not smaller in number than the threshold can be displayed as selection candidates on the display portion 24 of the portable terminal 2, for example, as shown in FIG. 3. That is, in the example shown in FIG. 3, nine keywords are displayed as selection candidates on the display portion 24 of the portable terminal 2.

The keyword reading portion 37 calculates levels of importance for the read keywords respectively and rearranges the keywords in order of importance. In this embodiment, the keyword reading portion 37 calculates a distance for one appearance of each keyword based on position information associated with each of the plurality of read keywords and the position information outputted from the request information receiving portion 36. That is, the keyword reading portion 37 calculates a distance between a position expressed by the position information associated with each of the plurality of keywords and the current position of the portable terminal 2 in accordance with one appearance of each keyword. The keyword reading portion 37 calculates a level of importance for one appearance of each keyword based on the calculated distances and the number of appearances in each of the plurality of keywords.

The keyword reading portion 37 assigns a numerical value to one appearance of each of the plurality of read keywords in accordance with the distance. Incidentally, this numerical value is a numerical value which increases as the distance decreases and which decreases as the distance increases. The keyword reading portion 37 calculates a level of importance for each keyword by adding numerical values assigned to appearances of each keyword. In the case where, for example, there are two appearances of a keyword "Akashi" and the distance of one appearance of the keyword "Akashi" is large while the distance of the other appearance of the keyword "Akashi" is small, the keyword reading portion 37 assigns a numerical value corresponding to the distance, e.g., "0.8" to one appearance of the keyword "Akashi" and a numerical value corresponding to the distance, e.g., "1.3" to the other appearance of the keyword "Akashi". The keyword reading portion 37 calculates a level of importance "2.1" for the keyword "Akashi" by adding the numerical values "0.8" and "1.3" assigned to the two appearances of the keyword "Akashi". In this manner, the keyword reading portion 37 can calculate levels of importance for keywords so that a high level of importance is given to a keyword which is short in distance in terms of each appearance but large in number of appearances. On the other hand, the keyword reading portion 37 can calculate levels of importance for keywords so that a low level of importance is given to a keyword which is long in distance in terms of each appearance but small in number of appearances. The keyword reading portion 37 rearranges the keywords in order of importance. The keyword reading portion 37 outputs the keywords rearranged in order of importance to the screen generating portion 38.

Although description has been made above in the case where the keyword reading portion 37 calculates a level of importance for each keyword based on the distances in appearances of the keyword and the number of appearances of the keyword, the keyword reading portion 37 is not limited to this description. For example, the keyword reading portion 37 may read a score corresponding to input information containing a keyword from the word-of-mouth information recording portion 32 so that the keyword reading portion 37 calculates the read score directly as a level of importance for the keyword. That is, the keyword reading portion 37 calculates levels of importance for keywords so that a high level of importance is given to a keyword which is high in score. On the other hand, the keyword reading portion 37 calculates levels of importance for keywords so that a low level of importance is given to a keyword which is low in score. In this manner, the keyword reading portion 37 can calculate a level of importance for each keyword in accordance with a score corresponding to input information containing the keyword. Alternatively, the keyword reading portion 37 may calculate a level of importance for each keyword in consideration of not only a score corresponding to input information containing the keyword but also the distance in terms of each appearance of the keyword and the number of appearances of the keyword.

The screen generating portion 38 generates a word-of-mouth information entry screen having selection fields in each of which a keyword desired by the user of the portable terminal 2 can be selected from a plurality of keywords outputted from the keyword reading portion 37, and an input field in which the user of the portable terminal 2 can input any sentence. The screen generating portion 38 generates selection fields in each of which keywords can be selected in order of importance in accordance with keywords rearranged in order of importance by the keyword reading portion 37. The screen generating portion 38 generates a word-of-mouth information entry screen having the generated selection fields and the input field. The screen generating portion 38 outputs screen data for the generated word-of-mouth information entry screen to the screen data transmitting portion 39.

The screen data transmitting portion (keyword presenting portion) 39 transmits the screen data outputted from the screen generating portion 38 to the portable terminal 2 through the network N. Thus, the word-of-mouth information entry screen can be displayed on the display portion 24 of the portable terminal 2, for example, as shown in FIG. 2 or FIG. 3. That is, keywords in each of selection fields for "What?" and "How was it?" as shown in FIG. 2 or FIG. 3 can be selected in order of importance. That is, in the example shown in FIG. 3, keywords 'Akashiyaki', 'Akashi', 'Soup', 'Feeling', 'Sauce', 'Line', 'In-Store', 'Octopus' and 'Takoyaki' can be selected in order of importance in a selection field for "What?". Thus, since the keywords can be displayed as selection candidates on the display portion 24 of the portable terminal 2 in order of importance, time and labor can be reduced when the user of the portable terminal 2 inputs word-of-mouth information.

The aforementioned information processing apparatus 3 may be achieved by installation of a program in any computer such as a personal computer. That is, the word-of-mouth information acquiring portion 31, the keyword extracting portion 33, the keyword registering portion 34, the request information receiving portion 36, the keyword reading portion 37, the screen generating portion 38 and the screen data transmitting portion 39 are embodied by a CPU of the computer which operates in accordance with the program for implementing these functions. Accordingly, the program for implementing these functions of the word-of-mouth information acquiring portion 31, the keyword extracting portion 33, the keyword registering portion 34, the request information receiving portion 36, the keyword reading portion 37, the screen generating portion 38 and the screen data transmitting portion 39 or a recording medium having the program recorded thereon is also an embodiment of the invention. In addition, the word-of-mouth information recording portion 32 and the keyword recording portion 35 are embodied by a storage device built in the computer or a storage device accessible from the computer.

Next, operation of the information processing apparatus 3 having the aforementioned configuration will be described with reference to FIG. 6 and FIG. 7.

Figure 6:
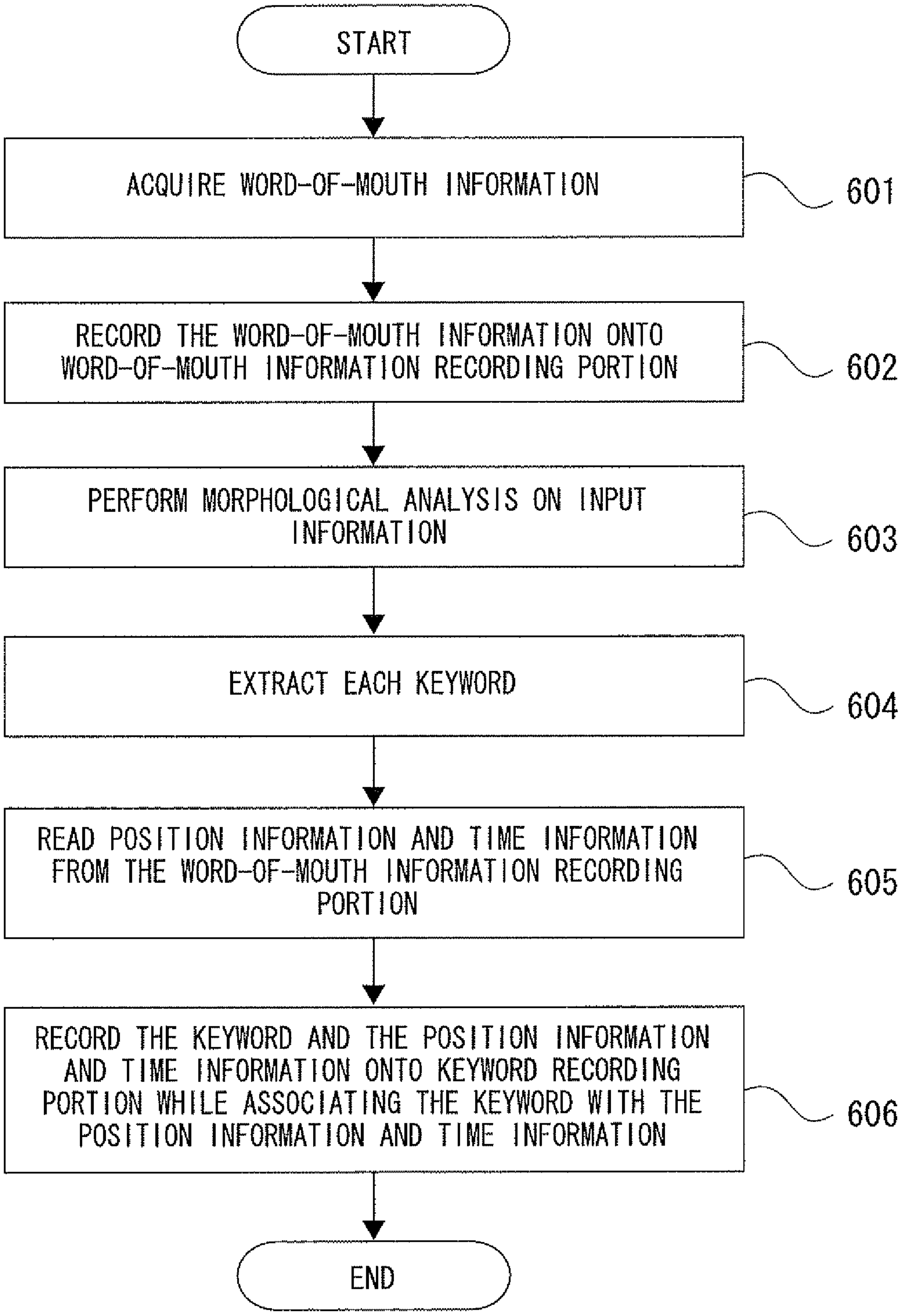
FIG. 6 illustrates an example of operation of the information processing apparatus in the case where word-of-mouth information transmitted from a portable terminal has been acquired through a network.

FIG. 6 illustrates an example of operation of the information processing apparatus 3 in the case where word-of-mouth information transmitted from a portable terminal 2 has been acquired through the network. That is, as shown in FIG. 6, the word-of-mouth information acquiring portion 31 acquires the word-of-mouth information transmitted from the portable terminal 2 through the network N (Operation 601). The word-of-mouth information acquiring portion 31 records the word-of-mouth information acquired in Operation 601 onto the word-of-mouth information recording portion 32 (Operation 602). Thus, the word-of-mouth information acquired in Operation 601 is recorded on the word-of-mouth information recording portion 32, for example, as shown in FIG. 4.

The keyword extracting portion 33 performs morphological analysis of entry information recorded in "Title" and "Remarks" of the word-of-mouth information recording portion 32 (Operation 603). By the morphological analysis, the entry information is divided into a plurality of words. In addition, a part of speech of each of the plurality of divided words is discriminated. The keyword extracting portion 33 extracts keywords from the plurality of divided words in accordance with a predetermined standard (Operation 604). For example, the keyword extracting portion 33 extracts keywords as independent words from the plurality of divided words and further extracts keywords having modification relation with the extracted keywords respectively. The keyword extracting portion 33 first extracts keywords as nouns from the independent words.

The keyword registering portion 34 reads position information and time information corresponding to the entry information containing each keyword extracted in Operation 604, from the word-of-mouth information recording portion 32 (Operation 605). The keyword registering portion 34 records the keyword extracted in Operation 604 and the position information and time information read in Operation 605, onto the keyword recording portion 35 while associating the extracted keyword with the read position information and time information (Operation 606). Thus, the position information, the time information and the keyword are recorded on the keyword recording portion 35, for example, as shown in FIG. 5.

Figure 7:
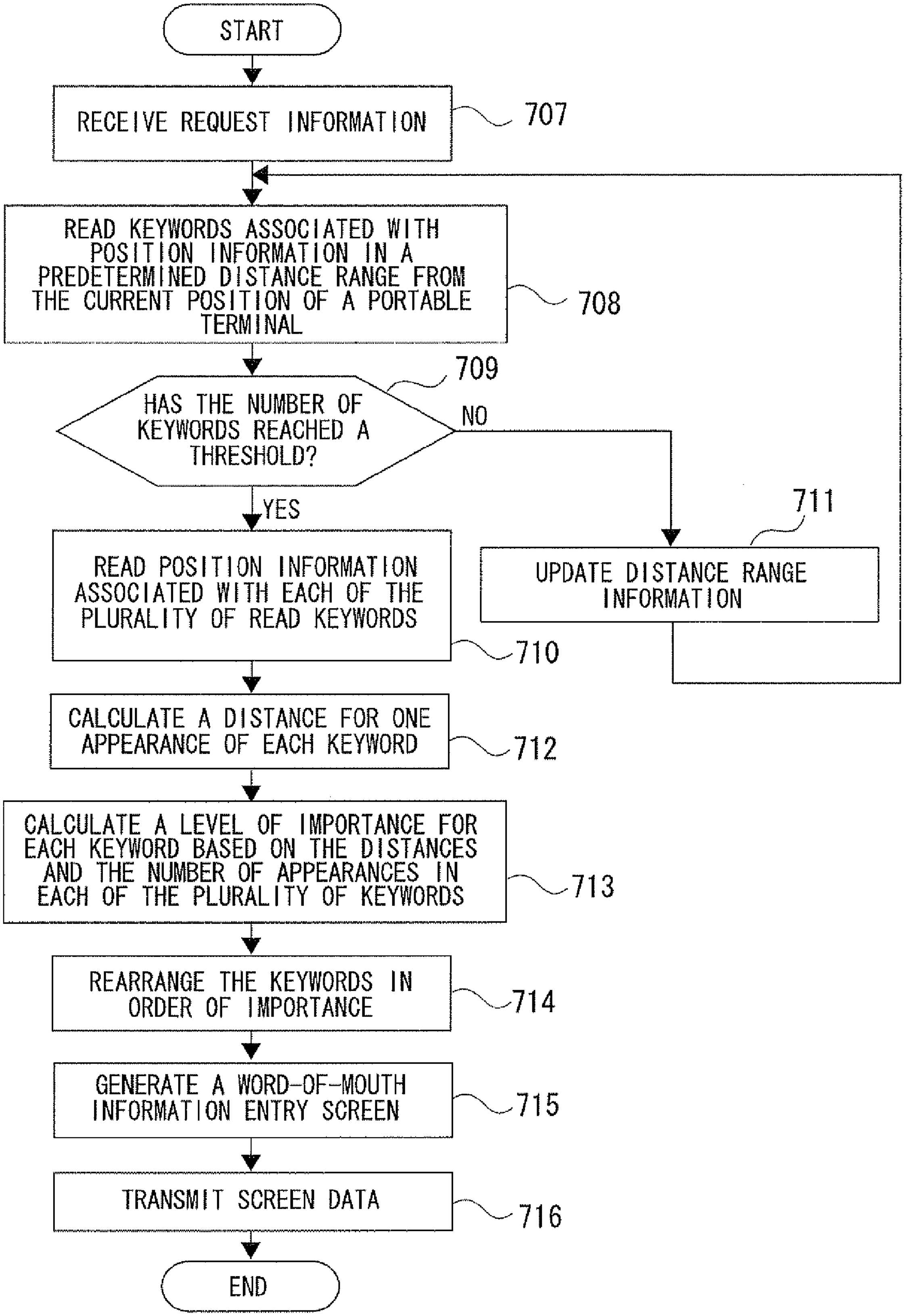
FIG. 7 illustrates an example of operation of the information processing apparatus in the case where request information transmitted from a portable terminal has been received through the network.

FIG. 7 illustrates an example of operation of the information processing apparatus 3 in the case where request information transmitted from a portable terminal 2 has been received through the network N. That is, as shown in FIG. 7, the request information receiving portion 36 receives the request information transmitted from the portable terminal 2 through the network N (Operation 707). The request information receiving portion 36 outputs position information contained in this request information to the keyword reading portion 37 based on the request information received in Operation 707. The keyword reading portion 37 reads keywords associated with position information in a predetermined distance range from the current position of the portable terminal 2 expressed by the position information outputted from the request information receiving portion 36, from a plurality of keywords recorded on the keyword recording portion 35 (Operation 708). Incidentally, this predetermined distance range is recorded in advance as distance range information on a not-shown memory of the information processing apparatus 3.

The keyword reading portion 37 judges whether or not the number of keywords read in Operation 708 has reached a threshold (Operation 709). When the keyword reading portion 37 makes a decision that the number of keywords read in Operation 708 has reached the threshold (YES in Operation 709), the keyword reading portion 37 further reads position information associated with each of the plurality of keywords read in Operation 708 from the keyword recording portion 35 (Operation 710). On the other hand, when the keyword reading portion 37 makes a decision that the number of keywords read in Operation 708 has not reached the threshold (NO in Operation 709), the keyword reading portion 37 updates the distance range information recorded in advance on the not-shown memory of the information processing apparatus 3 to widen the predetermined distance range (Operation 711). Then, the routine of processing goes back to Operation 708. Thus, the keywords not less in number than the threshold can be displayed as selection candidates on the display portion 24 of the portable terminal 2.

The keyword reading portion 37 calculates a distance between a position expressed by the position information read in Operation 710 and associated with each of the plurality of keywords and the current position of the portable terminal 2 expressed by the position information outputted from the request information receiving portion 36, for one appearance of each keyword (Operation 712). The keyword reading portion 37 calculates a level of importance for each keyword based on the distances calculated in Operation 712 and the number of appearances in each of the plurality of keywords read in Operation 708 (Operation 713). The keyword reading portion 37 rearranges the keywords in order of importance calculated in Operation 713 (Operation 714). The screen generating portion 38 generates a word-of-mouth information entry screen having selection fields in each of which a keyword desired by the user of the portable terminal 2 can be selected from the plurality of keywords rearranged in Operation 714 and an input field in which the user of the portable terminal 2 can input any sentence (Operation 715). The screen data transmitting portion 39 transmits screen data for the word-of-mouth information entry screen generated in Operation 715, to the portable terminal 2 through the network N (Operation 716).

According to the information processing apparatus 3 as described above, the request information receiving portion 36 acquires position information from a portable terminal 2 intended to input word-of-mouth information. The keyword reading portion 37 reads a plurality of keywords corresponding to the position information acquired by the request information receiving portion 36, from the keyword recording portion 35. The screen data transmitting portion 39 presents the plurality of read keywords as selection candidates to the portable terminal 2 intended to input word-of-mouth information. In this manner, the screen data transmitting portion 39 can present the plurality of read keywords as selection candidates even to an ordinary portable terminal 2. That is, in the case where a user of the portable terminal 2 is located in a certain region, keywords contained in word-of-mouth information becoming a topic of conversation currently in this region can be presented as selection candidates to the portable terminal 2. When the user of the portable terminal 2 selects a desired keyword from the plurality of keywords presented as selection candidates, word-of-mouth information is entered in the portable terminal 2. That is, the user of the portable terminal 2 can enter word-of-mouth information in the portable terminal 2 easily by selecting a keyword desired by the user of the portable terminal 2 from the plurality of keywords presented as selection candidates.

For example, various changes can be made as to the keyword reading method, the keyword importance level calculating method, etc. performed by the keyword reading portion.

Figure 8:
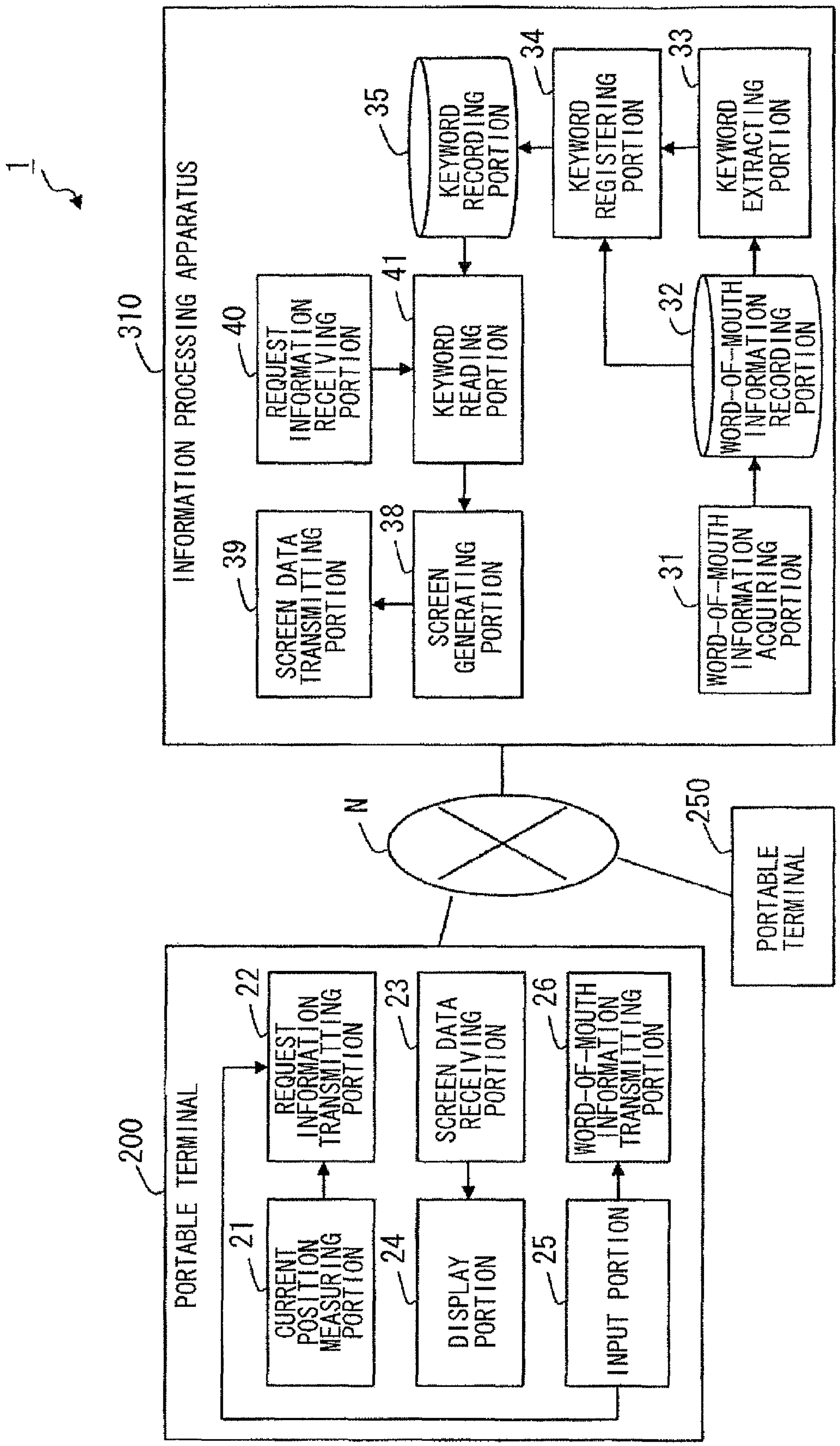
FIG. 8 illustrates the schematic configuration of a communication system including an information processing apparatus concerned with a first modification of the keyword reading portion.

FIG. 8 illustrates a communication system 1 including an information processing apparatus 310 concerned with a first modification of the keyword reading portion. That is, the information processing apparatus 310 shown in FIG. 8 includes a request information receiving portion 40 and a keyword reading portion 41, in place of the request information receiving portion 36 and the keyword reading portion 37 shown in FIG. 1. In FIG. 8, parts having the same functions as those in FIG. 1 are referred to by the same reference numerals and detailed description thereof will be omitted.

The request information receiving portion (terminal environment acquiring portion) 40 receives request information transmitted from a portable terminal 2 through the network N. The request information receiving portion 40 outputs position information contained in the received request information to the keyword reading portion 41 based on the received request information. In addition, the request information receiving portion 40 outputs time information contained in the received request information to the keyword reading portion 41 based on the received request information.

The keyword reading portion 41 reads keywords which are associated with position information in a predetermined distance range from the current position of the portable terminal 2 expressed by the position information outputted from the request information receiving portion 40 and which are associated with time information the same in time type information as the time information outputted from the request information receiving portion 40, from a plurality of keywords recorded on the keyword recording portion 35. The time type information is information abstracted from the time information. As examples of the time type information, there are time, morning, noon, evening, night, forenoon, afternoon, day of the week, weekday, holiday, Xiaohan, Gotobi (literally, day ending in 5 or 10), weekend, month, the Bon Festival, year end, New Year, Christmas, spring, summer, autumn, winter, season for pollen allergy, Golden Week, payday, new moon, full moon, tropical night, lucky day on the Japanese calendar, the Buddha's death, etc. In the case where, for example, there are two kinds of time type information, i.e. 'forenoon' and 'afternoon', the time type information for time information indicating '2006/09/24 17:05:02' becomes 'afternoon'. In addition, in the case where, for example, there are four kinds of time type information, i.e. 'spring' (March to May), 'summer' (June to August), 'autumn' (September to November) and 'winter' (December to February), the time type information for time information indicating '2006/09/24 17:05:02' becomes "autumn". The time type information is recorded in advance on a not-shown memory of the information processing apparatus 310.

In this manner, when, for example, the time type information expressed based on the time information outputted from the request information receiving portion 40 indicates a noon time zone, the keyword reading portion 41 can read keywords concerned with lunch provided in the noon time zone in a facility A, from the keyword recording portion 35. In addition, when, for example, the time type information expressed based on the time information outputted from the request information receiving portion 40 indicates a night time zone, the keyword reading portion 41 can read keywords concerned with alcohol provided in the night time zone in the facility A, from the keyword recording portion 35. Further, when, for example, the time type information expressed based on the time information outputted from the request information receiving portion 40 indicates a summer season, the keyword reading portion 41 can read keywords concerned with firework display events to be held in a region B, from the keyword recording portion 35. In addition, when, for example, the time type information expressed based on the time information outputted from the request information receiving portion 40 indicates a winter season, the keyword reading portion 41 can read keywords concerned with snow festival events to be held in the region B, from the keyword recording portion 35. That is, the keyword reading portion 41 can read keywords in accordance with the time type information even for the same region from the keyword recording portion 35.

Figure 9:
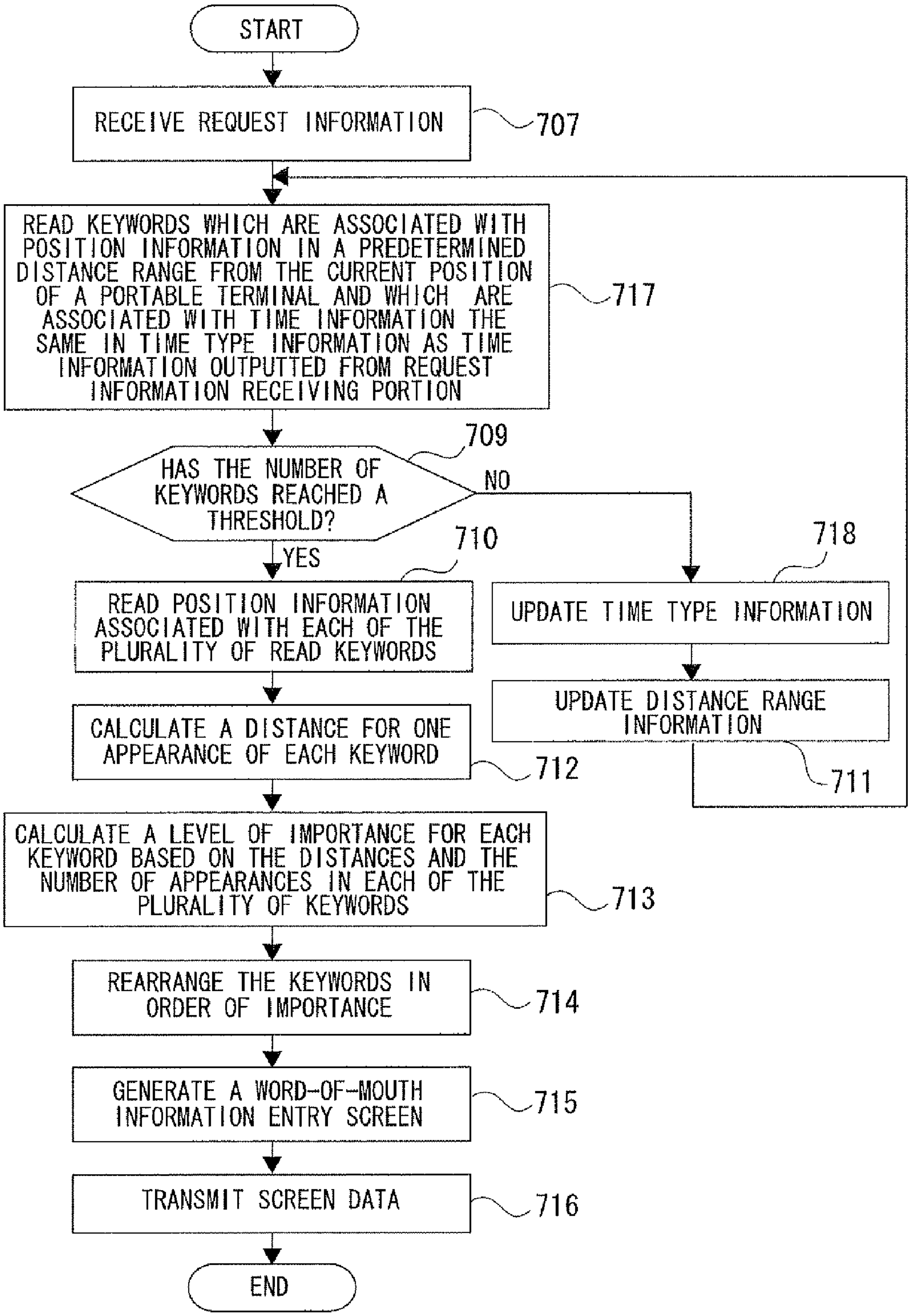
FIG. 9 illustrates an example of operation of the information processing apparatus in the case where request information transmitted from a portable terminal has been received through the network.

FIG. 9 illustrates an example of operation of the information processing apparatus 310 in the case where request information transmitted from a portable terminal 2 has been received through the network N. In FIG. 9, processes the same as those in FIG. 7 are referred to by the same reference numerals and detailed description thereof will be omitted. That is, after Operation 707, the request information receiving portion 40 outputs position information contained in the request information received in Operation 707, to the keyword reading portion 41 based on the request information. In addition, the request information receiving portion 40 outputs time information contained in the request information received in Operation 707, to the keyword reading portion 41 based on the request information.

The keyword reading portion 41 reads keywords which are associated with position information in a predetermined distance range from the current position of the portable terminal 2 expressed by the position information outputted from the request information receiving portion 40 and which are associated with time information the same in time type information as the time information outputted from the request information receiving portion 40, from a plurality of keywords recorded on the keyword recording portion 35 (Operation 717). When the keyword reading portion 41 makes a decision that the number of keywords read in Operation 717 has not reached the threshold (NO in Operation 709), the keyword reading portion 41 updates the time type information to increase its level of abstraction (Operation 718). Incidentally, to update the time type information so as to increase its level of abstraction means, for example, to update the time type information from hour (12 o'clock, 13 o'clock . . . ) to forenoon/afternoon, from forenoon/afternoon to day, from day to month, or from month to season.

At the time of calculation of a level of importance for each keyword in Operation 713, the keyword reading portion 41 may calculate a level of importance for each keyword based on a time difference between the time type information expressed based on the time information associated with each of the plurality of read keywords and the time type information expressed based on the time information outputted from the request information receiving portion 40, in addition to the distances calculated in Operation 712 and the number of appearances in each of the plurality of keywords read in Operation 717. In this case, the keyword reading portion 41 may calculate a level of importance for each keyword after the distances, the number of appearances and the time difference are weighted respectively.

According to the information processing apparatus 310 concerned with the first modification of the keyword reading portion as described above, when a user of the portable terminal 2 is located in a certain region, keywords contained in word-of-mouth information becoming a topic of conversation currently in this region can be displayed as selection candidates on the portable terminal 2 on the condition that the time type information is taken into consideration.

Figure 10:
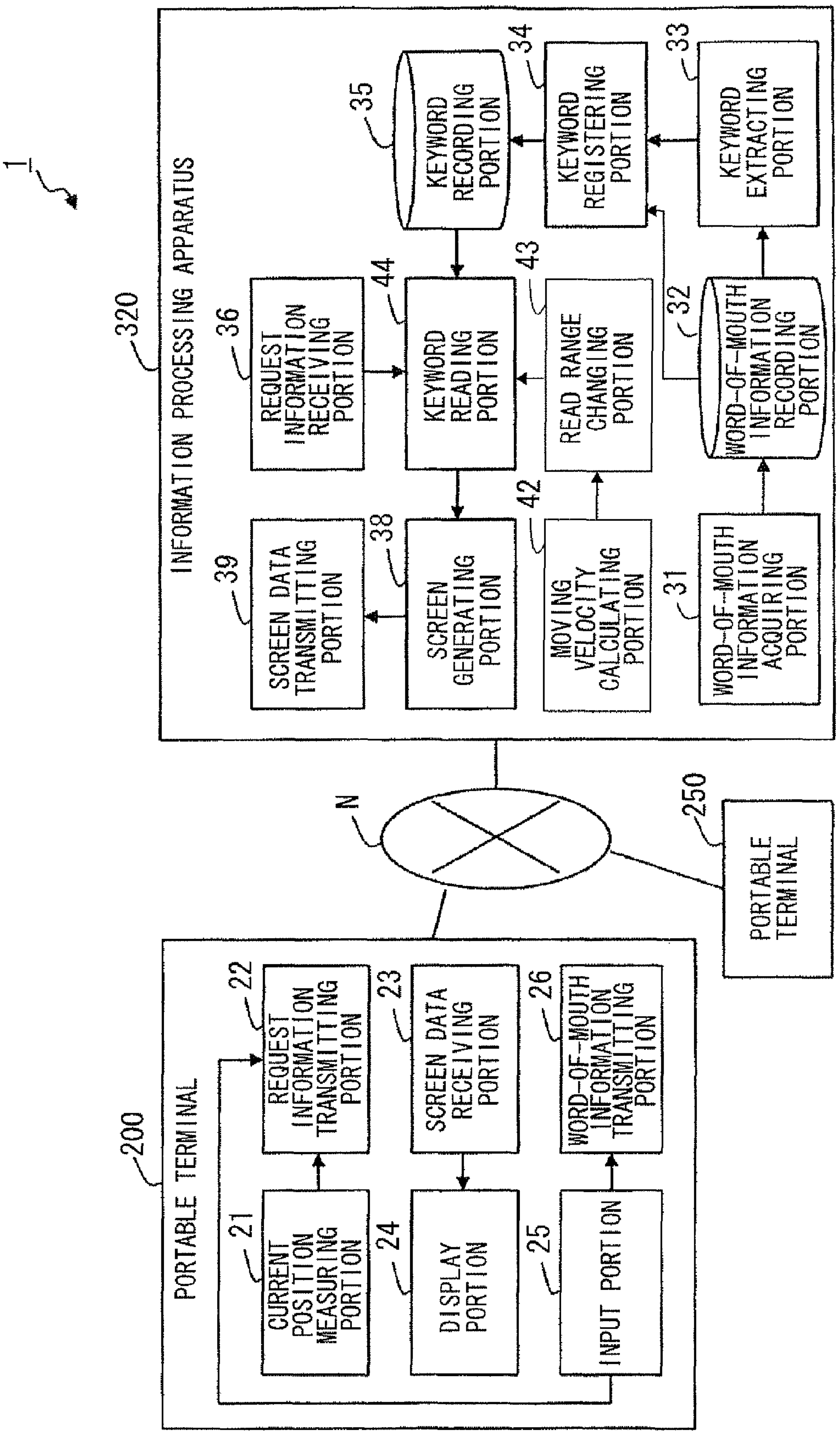
FIG. 10 illustrates the schematic configuration of a communication system including an information processing apparatus concerned with a second modification of the keyword reading portion.

FIG. 10 illustrates the schematic configuration of a communication system 1 including an information processing apparatus 320 concerned with a second modification of the keyword reading portion. That is, the information processing apparatus 320 shown in FIG. 10 includes a moving velocity calculating portion 42 and a read range changing portion 43 in addition to the information processing apparatus 3 shown in FIG. 1. In addition, the information processing apparatus 320 shown in FIG. 10 includes a keyword reading portion 44 in place of the keyword reading portion 37 shown in FIG. 1. In FIG. 10, parts having the same functions as those in FIG. 1 are referred to by the same reference numerals and detailed description thereof will be omitted.

The moving velocity calculating portion 42 acquires position information expressing the current position of a portable terminal 2 and time information expressing the current time from the portable terminal 2 through the network N at intervals of a predetermined time. The moving velocity calculating portion 42 calculates a latest moving velocity of the portable terminal 2 based on position information and time information acquired at the last time and the position information and time information acquired at this time. The moving velocity calculating portion 42 outputs the calculated moving velocity of the portable terminal 2 to the read range changing portion 43.

The read range changing portion 43 judges whether or not the moving velocity of the portable terminal 2 outputted from the moving velocity calculating portion 42 has reached a threshold. When the read range changing portion 43 makes a decision that the moving velocity of the portable terminal 2 has reached the threshold, the read range changing portion 43 instructs the keyword reading portion 44 to widen a predetermined distance range for reading keywords from the keyword recording portion 35. The threshold is recorded in advance on a not-shown memory of the information processing apparatus 320.

Upon reception of the instruction from the read range changing portion 43 to widen the predetermined distance range, the keyword reading portion 44 updates distance range information recorded on the not-shown memory of the information processing apparatus 320 to widen the predetermined distance range.

Figure 11:
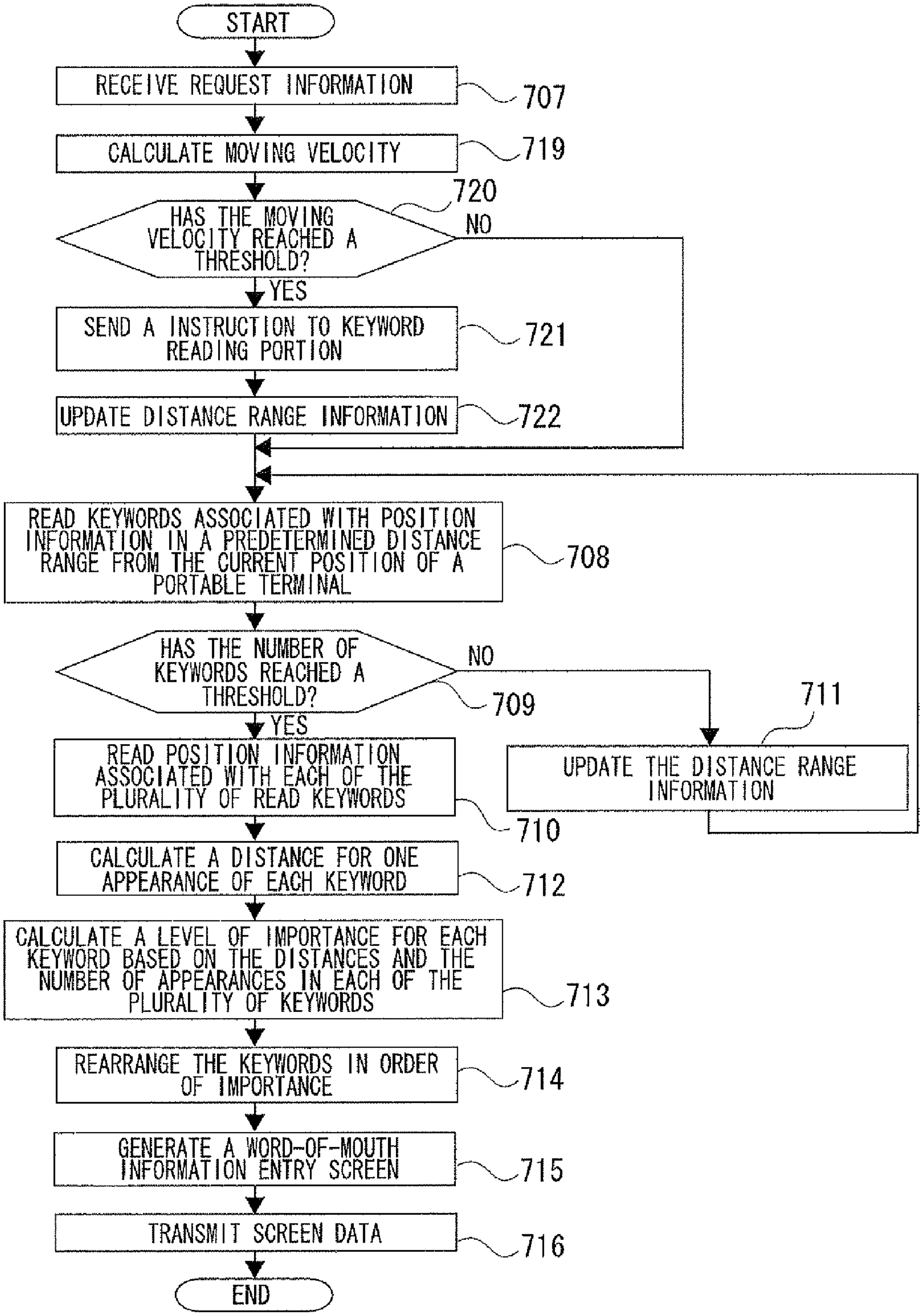
FIG. 11 illustrates an example of operation of the information processing apparatus in the case where request information transmitted from a portable terminal has been received through the network.

FIG. 11 illustrates an example of operation of the information processing apparatus 320 in the case where request information transmitted from a portable terminal 2 has been received through the network N. In FIG. 11, processes the same as those in FIG. 7 are referred to by the same reference numerals and detailed description thereof will be omitted. That is, after Operation 707, the moving velocity calculating portion 42 acquires position information expressing the current position of the portable terminal 2 and time information expressing the current time from the portable terminal 2 through the network N at intervals of a predetermined time, so that the moving velocity calculating portion 42 calculates a latest moving velocity of the portable terminal 2 based on position information and time information acquired at the last time and the position information and time information acquired at this time (Operation 719).

The read range changing portion 43 judges whether or not the moving velocity of the portable terminal 2 calculated in Operation 719 has reached a threshold (Operation 720). When the read range changing portion 43 makes a decision that the moving velocity of the portable terminal 2 calculated in Operation 719 has reached the threshold (YES in Operation 720), the read range changing portion 43 instructs the keyword reading portion 44 to widen a predetermined distance range for reading keywords from the keyword recording portion 35 (Operation 721). The keyword reading portion 44 updates distance range information recorded on the not-shown memory of the information processing apparatus 320 to widen the predetermined distance range, based on the instruction in Operation 721 (Operation 722). On the other hand, when the read range changing portion 43 makes a decision that the moving velocity of the portable terminal 2 calculated in Operation 719 has not reached the threshold (NO in Operation 720), the routine of processing goes to Operation 708.

According to the information processing apparatus 320 concerned with the second modification as described above, when the moving velocity of a portable terminal 2 has reached the threshold, the read range changing portion 43 instructs the keyword reading portion 44 to widen a predetermined distance range for reading keywords from the keyword recording portion 35 because a user of the portable terminal 2 is moving at a high-speed with, for example, a car or a train. In this manner, the keyword reading portion 44 can read a plurality of keywords from the keyword recording portion 35 in accordance with the widened predetermined distance range.

Figure 12:
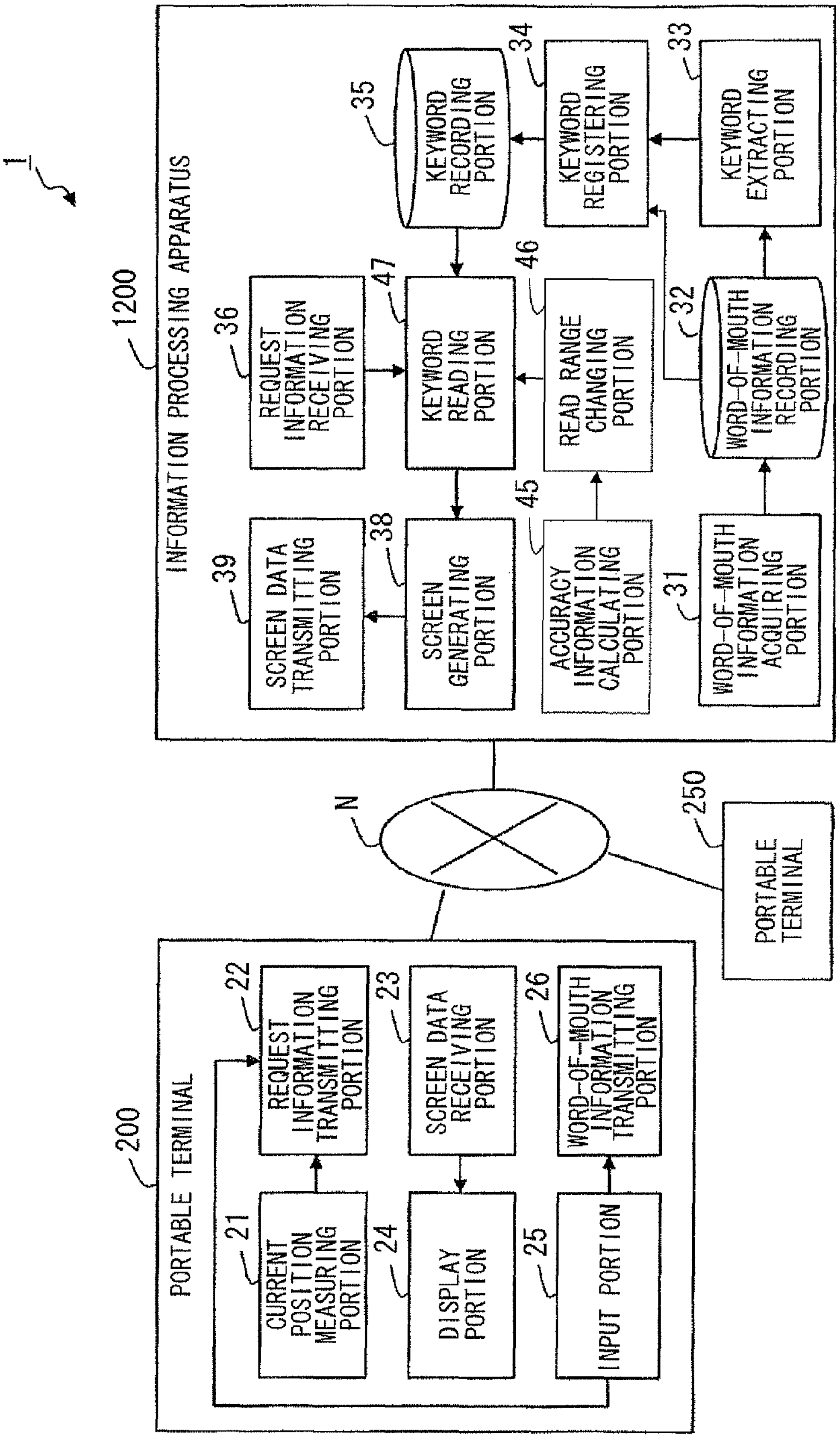
FIG. 12 illustrates the schematic configuration of a communication system including an information processing apparatus concerned with a third modification of the keyword reading portion.

FIG. 12 illustrates the schematic configuration of a communication system 1 including an information processing apparatus 1200 concerned with a third modification of the keyword reading portion. That is, the information processing apparatus 1200 shown in FIG. 12 includes an accuracy information calculating portion 45 and a read range changing portion 46 in addition to the information processing apparatus 3 shown in FIG. 1. In addition, the information processing apparatus 1200 shown in FIG. 12 includes a keyword reading portion 47 in place of the keyword reading portion 37 shown in FIG. 1. In FIG. 12, parts having the same functions as those in FIG. 1 are referred to by the same reference numerals and detailed description thereof will be omitted.

The accuracy information calculating portion 45 calculates accuracy information expressing measurement accuracy of position information expressing the current position of a portable terminal 2. The accuracy information calculating portion 45 calculates accuracy information expressing measurement accuracy of position information of a portable terminal 2 by measuring a measurement error of the position information generated due to an arrangement condition of geodetic earth orbiting satellites (GPS satellites), the number of geodetic earth orbiting satellites, the propagation speed of electromagnetic radiation, an influence of the ionosphere, an influence of an atmosphere, etc. In this embodiment, for example, the accuracy information calculating portion 45 expresses the accuracy information of the portable terminal 2 in 5 stages. That is, 1 is the lowest measurement accuracy and 5 is the highest measurement accuracy. That is, it can be said that if the measurement accuracy calculated by the accuracy information calculating portion 45 is low, reliability of the position information transmitted from the portable terminal 2 is low. On the other hand, it can be said that if the measurement accuracy calculated by the accuracy information calculating portion 45 is high, reliability of the position information transmitted from the portable terminal 2 is high. The accuracy information calculating portion 45 outputs the calculated accuracy information to the read range changing portion 46.

Alternatively, the accuracy information calculating portion 45 may calculate accuracy information of the portable terminal 2 by acquiring a measurement error of position information expressing the current position of the portable terminal 2 from an external error measuring device not shown.

The read range changing portion 46 judges whether or not the measurement accuracy expressed by the accuracy information outputted from the accuracy information calculating portion 45 has reached a threshold. When the read range changing portion 46 makes a decision that the measurement accuracy has not reached the threshold, the read range changing portion 46 instructs the keyword reading portion 47 to widen a predetermined distance range for reading keywords from the keyword recording portion 35. The threshold is recorded in advance on a not-shown memory of the information processing apparatus 1200.

Upon reception of the instruction from the read range changing portion 46 to widen the predetermined distance range, the keyword reading portion 47 updates distance range information recorded on the not-shown memory of the information processing apparatus 1200 to widen the predetermined distance range.

Figure 13:
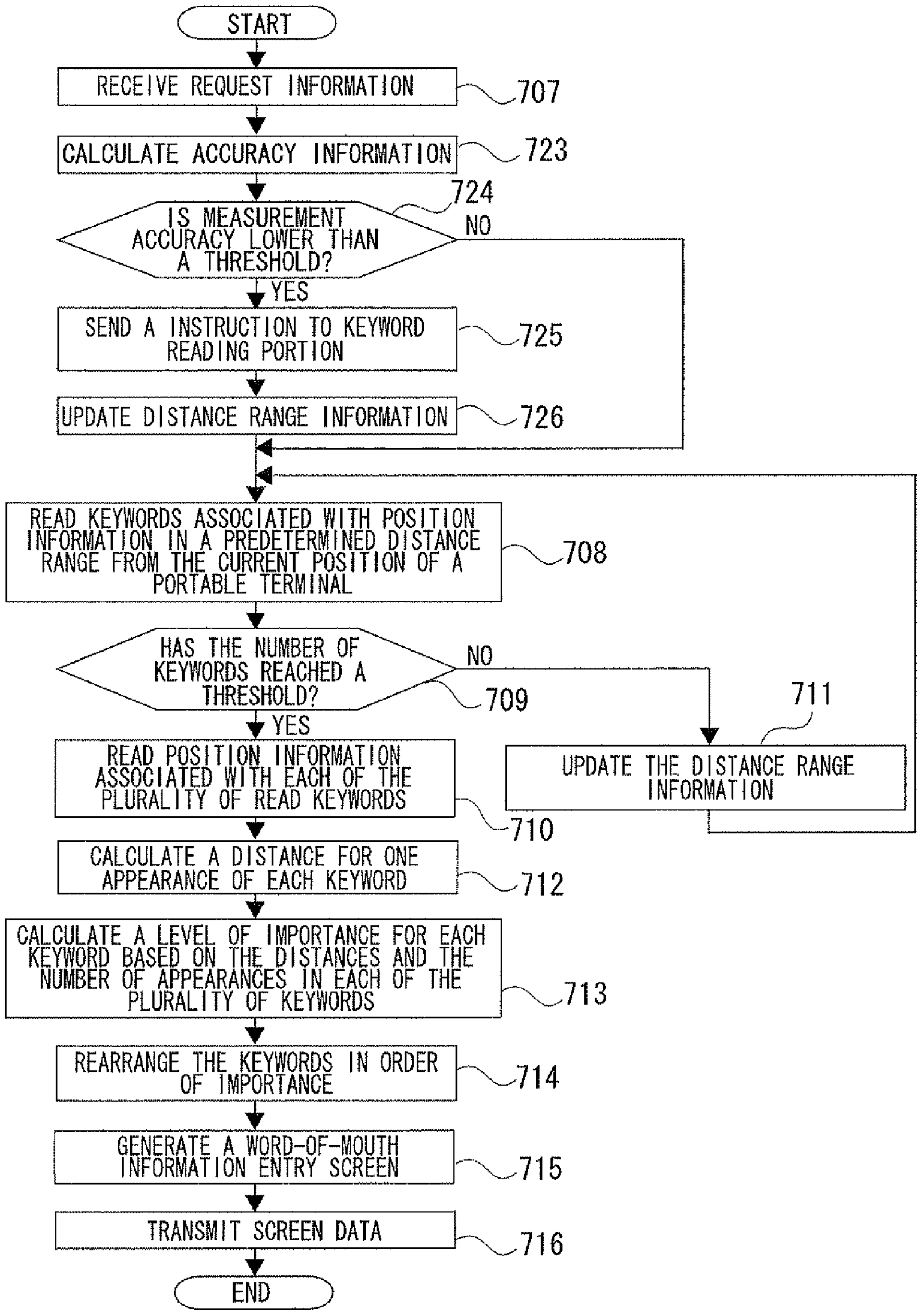
FIG. 13 illustrates an example of operation of the information processing apparatus in the case where request information transmitted from a portable terminal has been received through the network.

Next, operation of the information processing apparatus 1200 having the aforementioned configuration will be described with reference to FIG. 13. FIG. 13 illustrates an example of operation of the information processing apparatus 1200 in the case where request information transmitted from a portable terminal 2 has been received through the network N. In FIG. 13, processes the same as those in FIG. 7 are referred to by the same reference numerals and detailed description thereof will be omitted. That is, after Operation 707, the accuracy information calculating portion 45 calculates accuracy information expressing measurement accuracy of position information expressing the current position of the portable terminal 2 (Operation 723).

The read range changing portion 46 judges whether or not the measurement accuracy expressed by the accuracy information calculated in Operation 723 is lower than a threshold (Operation 724). When the read range changing portion 46 makes a decision that the measurement accuracy expressed by the accuracy information calculated in Operation 723 is lower than the threshold (YES in Operation 724), the read range changing portion 46 instructs the keyword reading portion 47 to widen a predetermined distance range for reading keywords from the keyword recording portion 35 (Operation 725). The keyword reading portion 47 updates distance range information recorded on a not-shown memory of the information processing apparatus 1200 to widen the predetermined distance range, based on the instruction in Operation 725 (Operation 726). On the other hand, when the read range changing portion 46 makes a decision that the measurement accuracy expressed by the accuracy information calculated in Operation 723 is not lower than the threshold (NO in Operation 724), the routine of processing goes to Operation 708.

According to the information processing apparatus 1200 concerned with the third modification of the keyword reading portion as described above, when measurement accuracy is lower than the threshold, the read range changing portion 46 instructs the keyword reading portion 47 to widen a predetermined distance range for reading keywords from the keyword recording portion 35 because reliability of position information expressing the current position of a portable terminal 2 is low. In this manner, the keyword reading portion 47 can read a plurality of keywords from the keyword recording portion 35 in accordance with the widened predetermined distance range.

Figure 14:
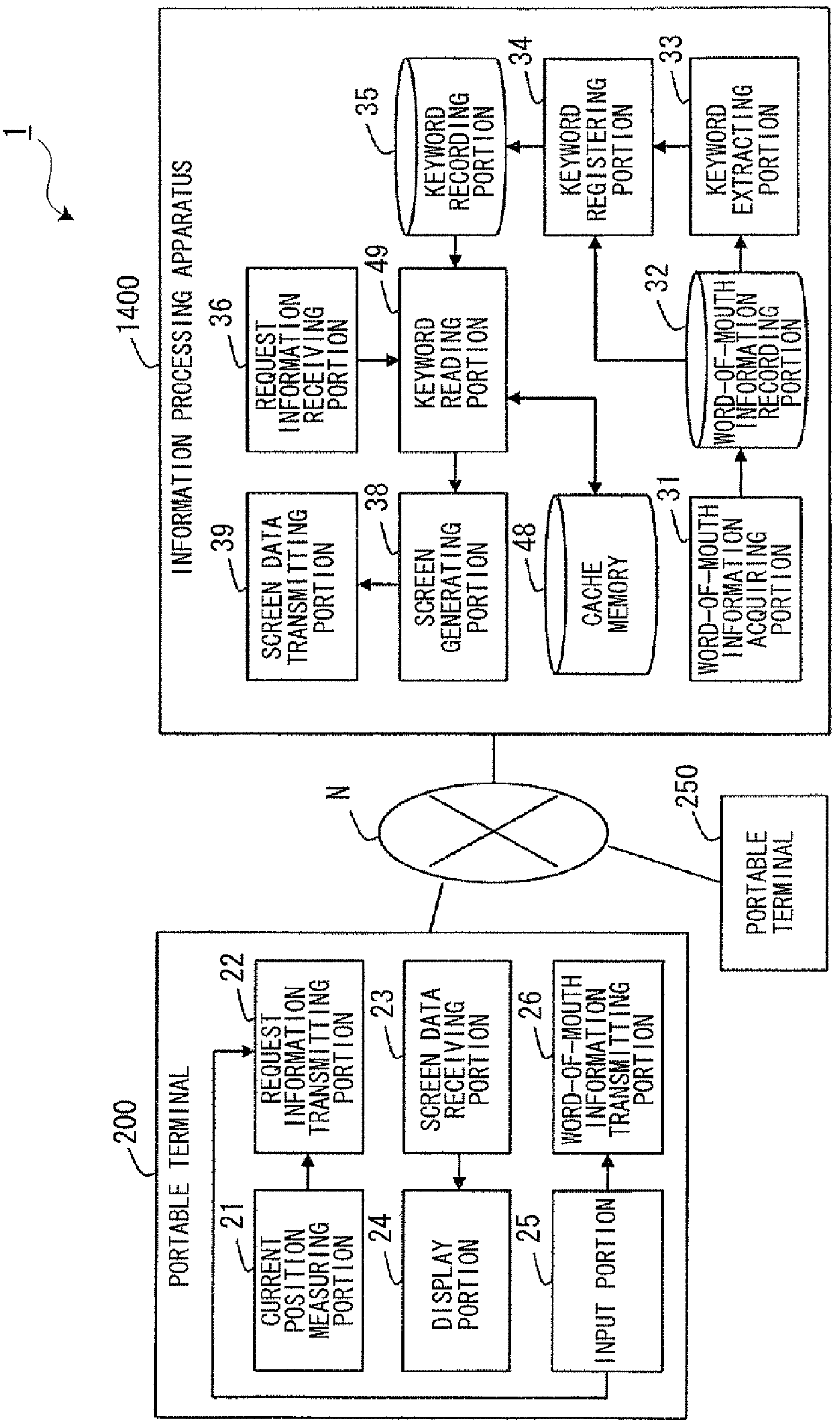
FIG. 14 illustrates the schematic configuration of a communication system including an information processing apparatus concerned with a fourth modification of the keyword reading portion.

FIG. 14 illustrates the schematic configuration of a communication system 1 including an information processing apparatus 1400 concerned with a fourth modification of the keyword reading portion. That is, the information processing apparatus 1400 shown in FIG. 14 includes a cache memory 48 in addition to the information processing apparatus 3 shown in FIG. 1. In addition, the information processing apparatus 1400 shown in FIG. 14 includes a keyword reading portion 49 in place of the keyword reading portion 37 shown in FIG. 1. In FIG. 14, parts having the same functions as those in FIG. 1 are referred to by the same reference numerals and detailed description thereof will be omitted.

Position information outputted from the request information receiving portion 36 and a plurality of keywords read in the past from the keyword recording portion 35 based on this position information are recorded on the cache memory 48 by the keyword reading portion 49. That is, the plurality of keywords rearranged in order of importance by the keyword reading portion 49 are recorded on the cache memory 48. For example, the cache memory 48 is includes a static RAM. In addition, the cache memory 48 is a memory accessible more speedily than the keyword recording portion 35. The plurality of keywords recorded on the cache memory 48 are deleted automatically if the plurality of keywords have not been read in a predetermined time by the keyword reading portion 49.

When a distance calculated based on the position information outputted from the request information receiving portion 36 and position information acquired in the past is in a predetermined distance range, the keyword reading portion 49 reads a plurality of keywords from the cache memory 48 instead of the keyword recording portion 35. On the other hand, when a distance calculated based on the position information outputted from the request information receiving portion 36 and position information acquired in the past is not in the predetermined distance range, the keyword reading portion 49 reads a plurality of keywords from the keyword recording portion 35.

Figure 15:
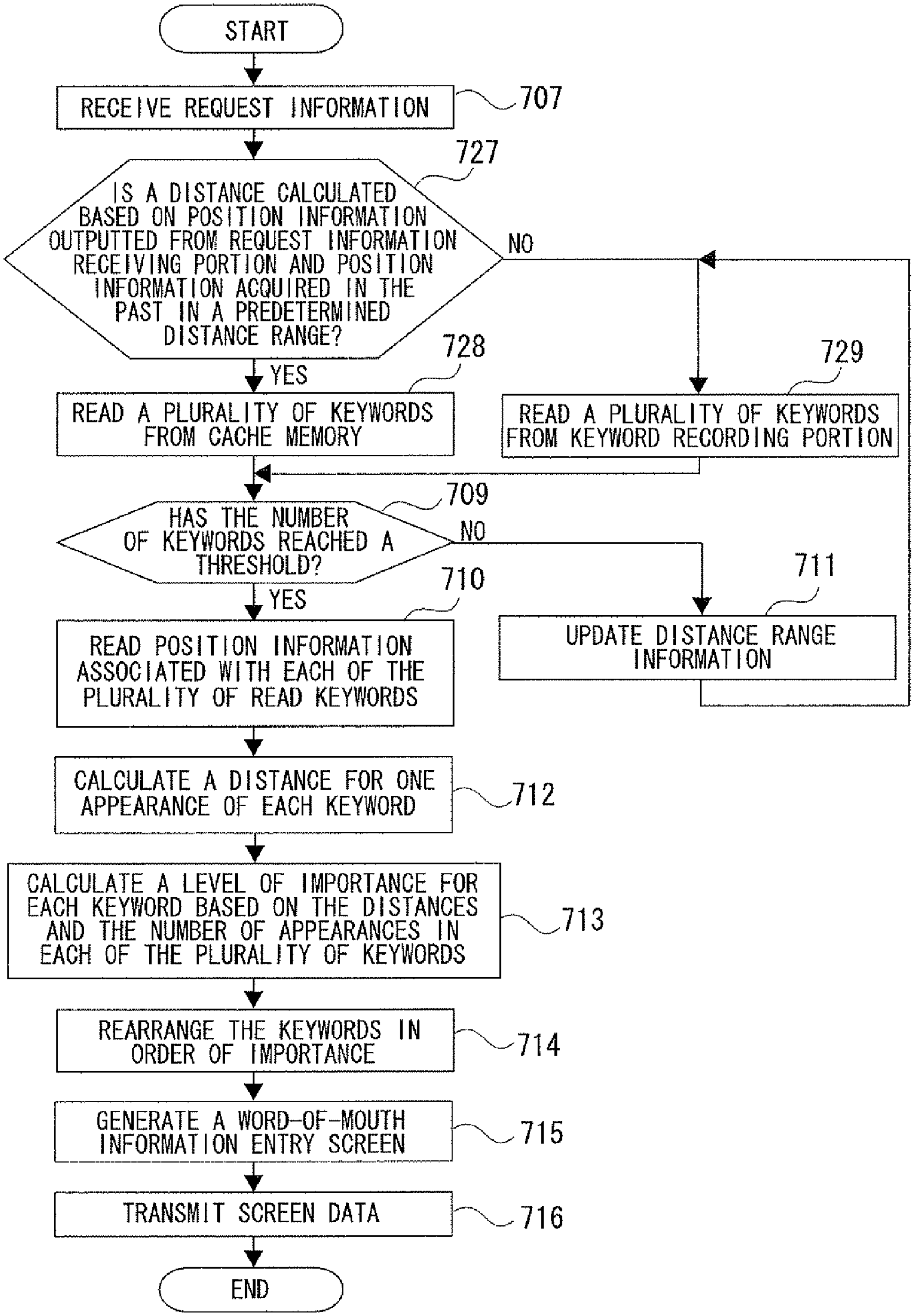
FIG. 15 illustrates an example of operation of the information processing apparatus in the case where request information transmitted from a portable terminal has been received through the network.

FIG. 15 illustrates an example of operation of the information processing apparatus 1400 in the case where request information transmitted from a portable terminal 2 has been received through the network N. In FIG. 15, processes the same as those in FIG. 7 are referred to by the same reference numerals and detailed description thereof will be omitted. That is, after Operation 707, the keyword reading portion 49 judges whether or not a distance calculated based on position information outputted from the request information receiving portion 36 and position information acquired in the past is in a predetermined distance range (Operation 727). When the keyword reading portion 49 makes a decision that the distance calculated based on the position information outputted from the request information receiving portion 36 and the position information acquired in the past is in the predetermined distance range (YES in Operation 727), the keyword reading portion 49 reads a plurality of keywords from the cache memory 48 instead of the keyword recording portion 35 (Operation 728).

On the other hand, when the keyword reading portion 49 makes a decision that the distance calculated based on the position information outputted from the request information receiving portion 36 and the position information acquired in the past is not in the predetermined distance range (NO in Operation 727), the keyword reading portion 49 reads a plurality of keywords from the keyword recording portion 35 (Operation 729).

According to the information processing apparatus 1400 concerned with the fourth modification as described above, a plurality of keywords rearranged in order of importance by the keyword reading portion 49 are recorded on the cache memory 48. When a distance calculated based on position information outputted from the request information receiving portion 36 and position information acquired in the past is in a predetermined distance range, the keyword reading portion 49 reads a plurality of keywords from the cache memory 48 instead of the keyword recording portion 35. Since the plurality of keywords are read from the cache memory 48, the keyword reading portion 49 can read the keywords more speedily, compared with the case where the keyword reading portion 49 reads the plurality of keywords from the keyword recording portion 35. In addition, since the plurality of keywords rearranged in order of importance are recorded on the cache memory 48, the keyword reading portion 49 need not calculate any level of importance for each of the plurality of keywords read from the cache memory 48. As a result, the processing speed of the information processing apparatus 1400 is improved.

Figure 16:
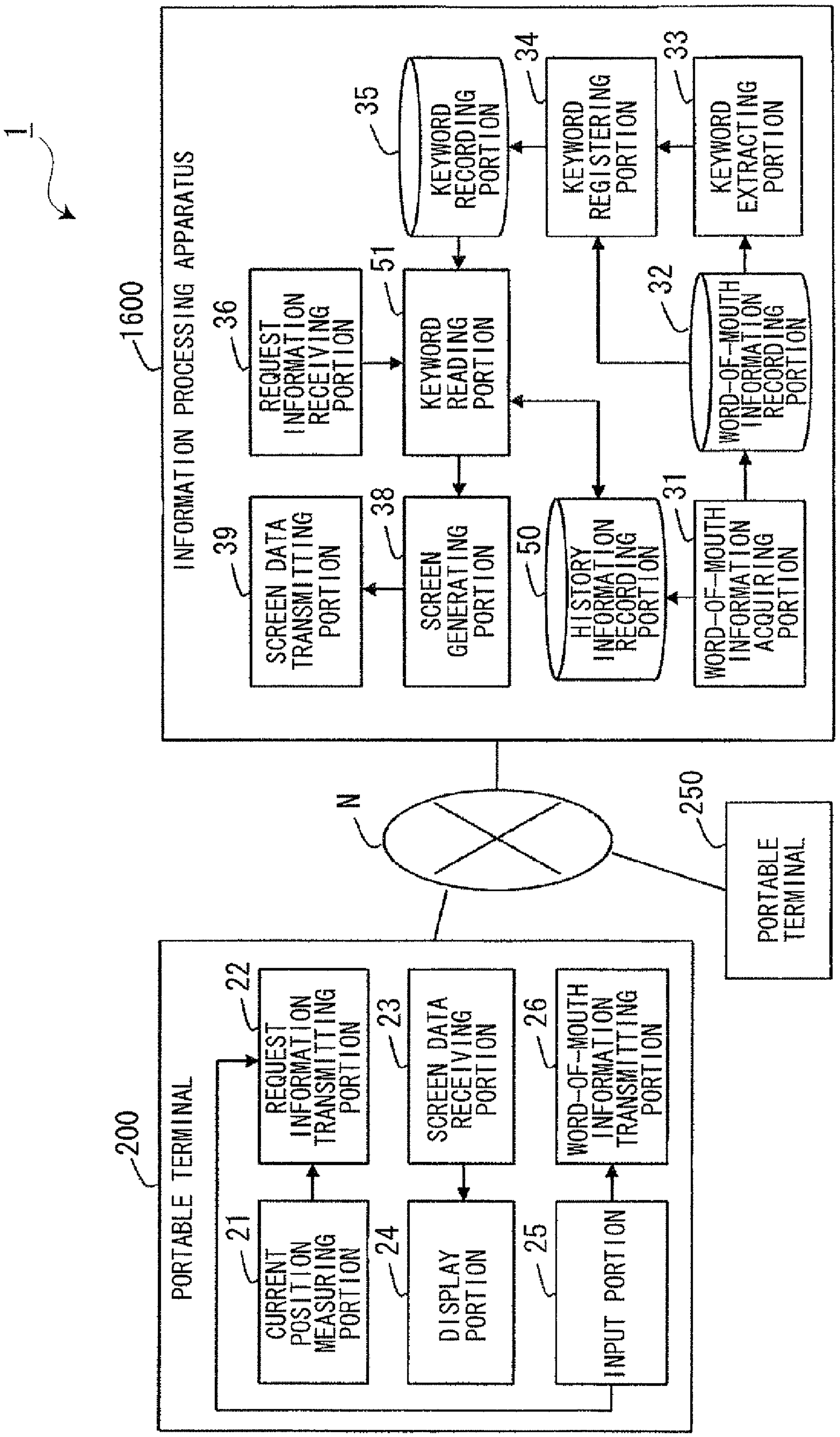
FIG. 16 illustrates the schematic configuration of a communication system including an information processing apparatus concerned with a fifth modification of the keyword reading portion.

FIG. 16 illustrates the schematic configuration of a communication system 1 including an information processing apparatus 1600 concerned with a fifth modification of the keyword reading portion. That is, the information processing apparatus 1600 shown in FIG. 16 includes a history information recording portion 50 in addition to the information processing apparatus 3 shown in FIG. 1. In addition, the information processing apparatus 1600 shown in FIG. 16 includes a keyword reading portion 51 in place of the keyword reading portion 37 shown in FIG. 1. In FIG. 16, parts having the same functions as those in FIG. 1 are referred to by the same reference numerals and detailed description thereof will be omitted.

The history information recording portion 50 records profile information expressing tastes of users of portable terminals 2 and history information expressing histories of word-of-mouth information acquired from the portable terminals 2. The profile information is information not only expressing age, gender, name, educational background, and single/married of each user of each portable terminal 2 but in addition expressing tastes of each user such as hobby, favorite music, favorite food, and favorite travel destination. The profile information is inputted in advance by each user of each portable terminal 2 so as to be recorded on the history information recording portion 50. In addition, the history information is recorded in time series on the history information recording portion 50 by the word-of-mouth information acquiring portion 31. The profile information and the history information of the history information recording portion 50 are recorded in accordance with each user of each portable terminal 2.

The keyword reading portion 51 calculates a distance for one appearance of each keyword based on position information associated with each of a plurality of read keywords and position information outputted from the request information receiving portion 36. That is, the keyword reading portion 51 calculates a distance between a position expressed by the position information associated with each of the plurality of keywords and the current position of the portable terminal 2, for one appearance of each keyword. The keyword reading portion 51 calculates a level of importance for each keyword based on the calculated distances, the number of appearances in each of the plurality of keywords, and a level of similarity between each of the plurality of keywords and the profile information and history information.

The keyword reading portion 51 assigns a numerical value to one appearance of each of the plurality of read keywords in accordance with the distance. The numerical value is a numerical value which increases as the distance decreases and which decreases as the distance increases. The keyword reading portion 51 adds numerical values assigned to appearances of each of the plurality of keywords for each keyword. In addition, the keyword reading portion 51 calculates a level of similarity between each of the plurality of keywords and the profile information and history information. For example, the level of similarity is calculated based on the number of appearances of a keyword or its similar keyword contained in the profile information and history information. The keyword reading portion 51 calculates a level of importance for each keyword by adding the calculated level of similarity to the sum of the numerical values of appearances of each keyword. In this manner, for example, the keyword reading portion 51 can calculate a level of importance for each keyword so that a keyword high in similarity has a high level of importance. On the other hand, for example, the keyword reading portion 51 can calculate a level of importance for each keyword so that a keyword low in similarity has a low level of importance.

Figure 17:
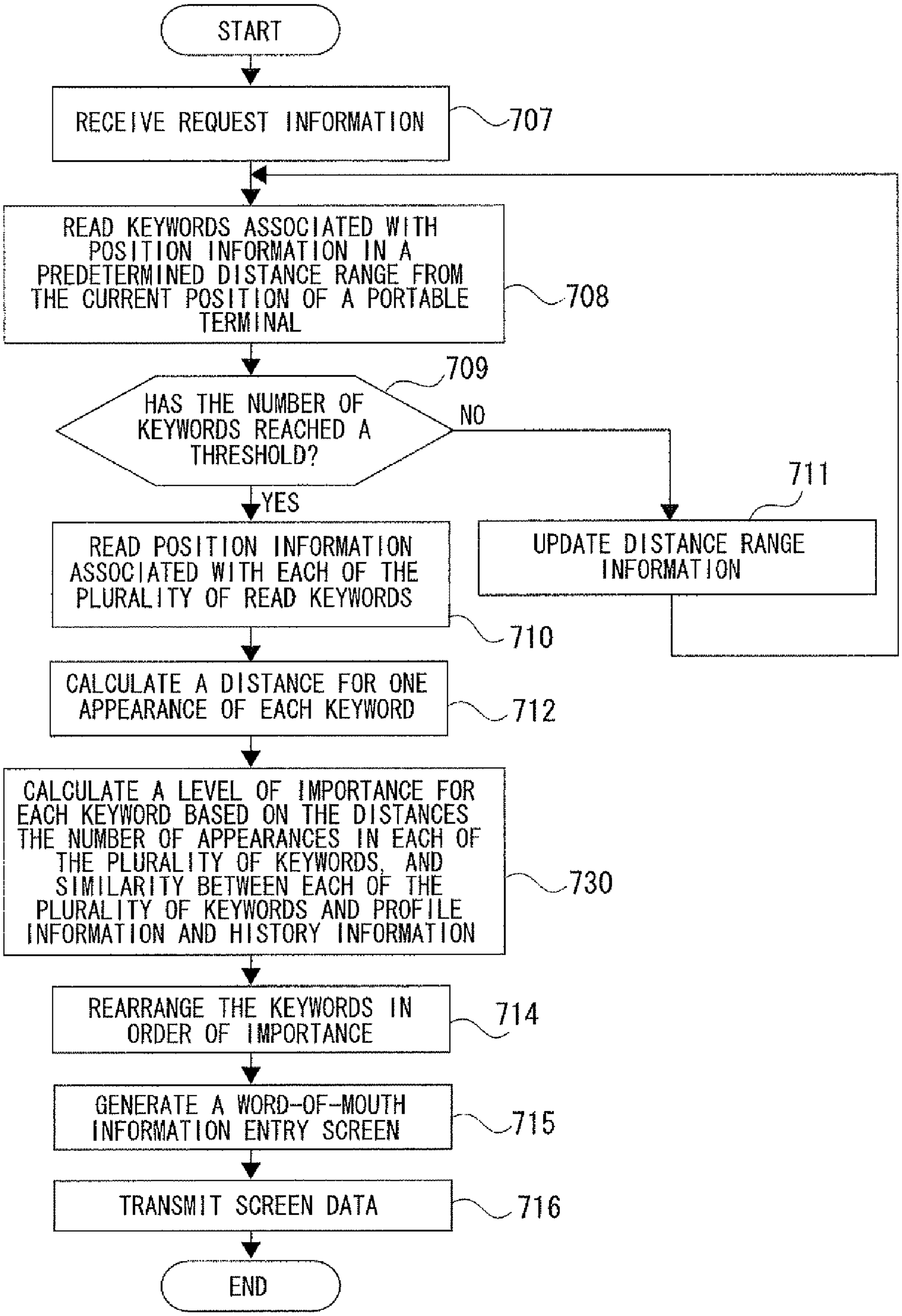
FIG. 17 illustrates an example of operation of the information processing apparatus in the case where request information transmitted from a portable terminal has been received through the network.

FIG. 17 illustrates an example of operation of the information processing apparatus 1600 in the case where request information transmitted from a portable terminal 2 has been received through the network N. In FIG. 17, processes the same as those in FIG. 7 are referred to by the same reference numerals and detailed description thereof will be omitted. That is, after Operation 712, the keyword reading portion 51 calculates a level of importance for each keyword based on the distances calculated in Operation 712, the number of appearances of each of the keywords read in Operation 708 and the level of similarity between each of the plurality of keywords read in Operation 708 and the profile information and history information (Operation 730).

According to the information processing apparatus 1600 concerned with the fifth modification as described above, the keyword reading portion 51 calculates a level of importance for each keyword based on the level of similarity between each of a plurality of read keywords and the profile information and history information in addition to the distances calculated based on position information associated with each of the plurality of read keywords and position information outputted from the request information receiving portion 36, and the number of appearances of each of the plurality of read keywords. That is, it can be said that a keyword having a high level of similarity to the profile information and history information is a keyword which a user of a portable terminal 2 uses frequently. In this manner, keywords are displayed as selection candidates in order of importance on the portable terminal 2, so that time and labor can be reduced when the user of the portable terminal 2 enters word-of-mouth information.

Figure 18:
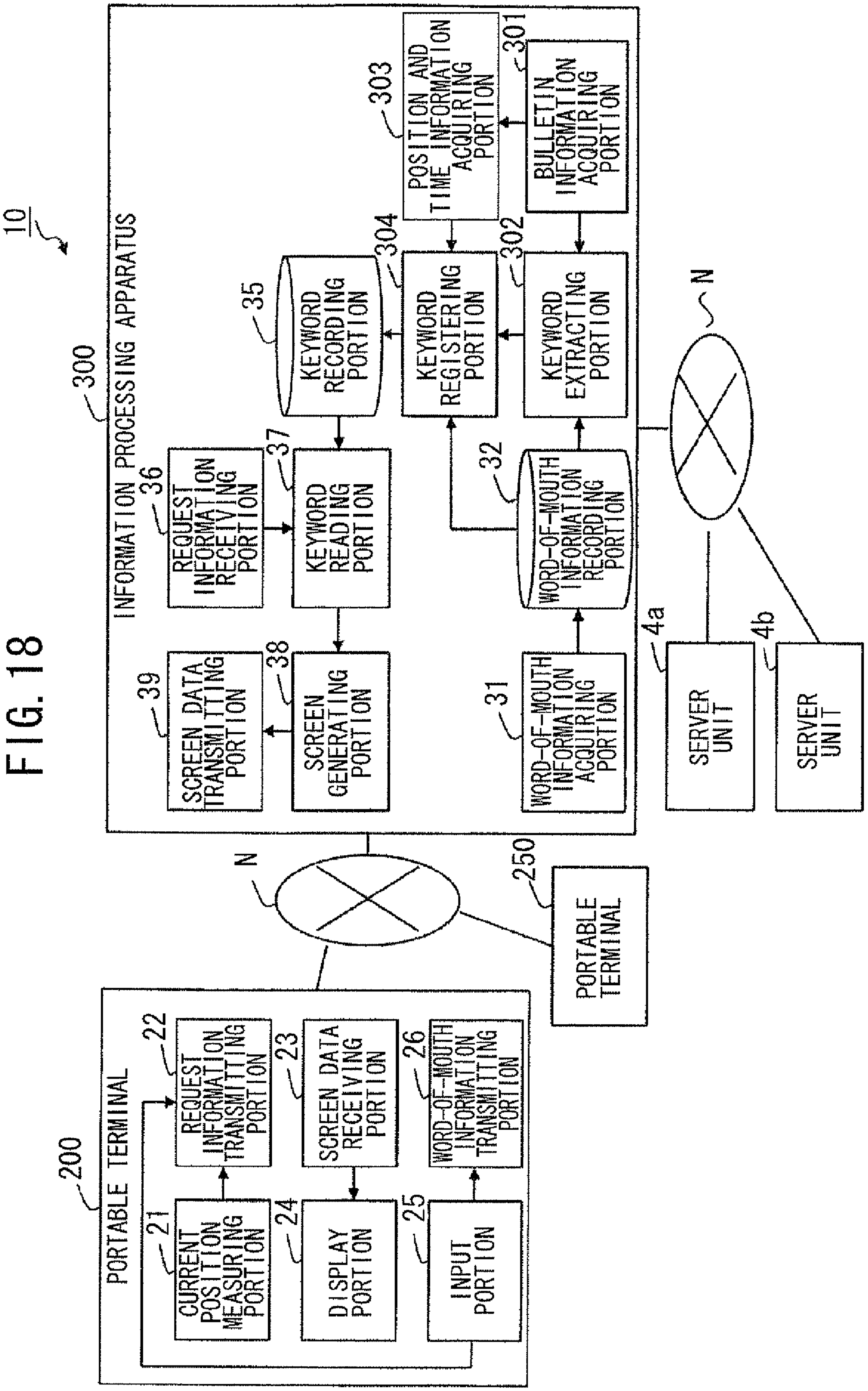
FIG. 18 illustrates the schematic configuration of a communication system according to a second example embodiment of the invention.

FIG. 18 illustrates the schematic configuration of a communication system 10. That is, the communication system 10 includes server units 4*a* and 4*b* in addition to the communication system 1 shown in FIG. 1. In addition, the communication system 10 includes an information processing apparatus 300 in place of the information processing apparatus 3 shown in FIG. 1. Although two server units 4*a* and 4*b* are shown in FIG. 18 for the sake of simplification of description, the number of server units 4*a* and 4*b* included in the communication system 10 is arbitrary. In FIG. 18, parts having the same functions as those in FIG. 1 are referred to by the same reference numerals and detailed description thereof will be omitted.

Where members having the same function must be particularly distinguished from one another for description of the members, description will be made with an English lowercase character attached to each of the members for distinction, e.g. like server unit 4*a*. In the case where members having the same function need not be particularly distinguished from one another or are named generically, description will be made with no English lowercase character attached to each of the members, e.g. like server unit 4.

For example, the server units 4 are Web servers each of which has a plurality of pieces of information recorded thereon. In this embodiment, the server unit 4*a* is a Web server for providing word-of-mouth information to viewers. In addition, the server unit 4*b* is a Web server for providing blogs to viewers. The information recorded on the server units 4 contains bulletin information posted by information providers, and image information expressing any images.

FIG. 19 illustrates the data structure of XML data recorded in the server unit 4*a*. Although the data structure of XML data is shown in FIG. 19, any language may be used in place of XML. In the fourth to fifteenth lines of the XML data shown in FIG. 19, name, URL, score, price, category, nearest station, address, phone, open time, regular holiday, latitude, and longitude with respect to the restaurant are defined respectively. In addition, in the sixteenth to thirtieth lines of the XML data shown in FIG. 19, word-of-mouth information of users (information providers) with respect to this restaurant is defined respectively. That is, the structured XML data are recorded in the server unit 4*a* as shown in FIG. 19. The server unit 4*a* executes a screen generating program for transforming the XML data shown in FIG. 19 into HTML data so that web pages are displayed by any browser.

The information processing apparatus 300 includes a bulletin information acquiring portion 301 and a position and time information acquiring portion 303 in addition to the information processing apparatus 3 shown in FIG. 1. In addition, the information processing apparatus 300 includes a keyword extracting portion 302 and a keyword registering portion 304 in place of the keyword extracting portion 33 and the keyword registering portion 34 shown in FIG. 1. The bulletin information acquiring portion 301 and the position and time information acquiring portion 303 may be embodied by a CPU of a computer which operates in accordance with a program for implementing these functions.

The bulletin information acquiring portion 301 acquires bulletin information from the server unit 4. Specifically, for acquisition of bulletin information from the server unit 4*a*, the bulletin information acquiring portion 301 acquires bulletin information which expresses ‘although it is a super famous restaurant for Akashiyaki, the dish is less tasty than before.’ described between <comment> tags in the twentieth line shown in FIG. 19 and ‘I came from Tokyo to eat it. It was very tasty as the reputation suggested. I will come here again.’ described between <comment> tags in the twenty-sixth line shown in FIG. 19. In addition, for acquisition of bulletin information from the server unit 4*b*, the bulletin information acquiring portion 301 acquires bulletin information expressing blog diaries. The bulletin information acquiring portion 301 outputs the acquired bulletin information to the keyword extracting portion 302 and the position and time information acquiring portion 303.

The keyword extracting portion 302 is provided with a function of dividing the bulletin information into a plurality of words by performing morphological analysis of the bulletin information outputted from the bulletin information acquiring portion 301 and extracting keywords from the plurality of divided words in accordance with a predetermined standard, in addition to the function of the keyword extracting portion 33 shown in FIG. 1. The keyword extracting portion 302 extracts keywords as independent words (nouns) from the plurality of divided words and further extracts keywords having modification relation with the extracted keywords, in the same manner as the keyword extracting portion 33 shown in FIG. 1. The keyword extracting portion 302 outputs the extracted keywords to the keyword registering portion 304.

Where the keyword outputted from the keyword extracting portion 302 is a keyword extracted from the server unit 4*a*, the position and time information acquiring portion (position information acquiring portion) 303 acquires position information from the server unit 4*a*. The position and time information acquiring portion 303 acquires “34.6452698700187” described between <latitude> tags in the fourteenth line shown in FIG. 19 and “134.993692545589” described between <longitude> tags in the fifteenth line shown in FIG. 19, as position information of the keyword. In addition, the position and time information acquiring portion 303 extracts time information from the server unit 4*a*. The position and time information acquiring portion 303 acquires “2007/7/9, 21:24” described between <date and time> tags in the eighteenth line shown in FIG. 19 and “2007/7/1,23:18” described between <date and time> tags in the twenty-fourth line shown in FIG. 19, as time information of the keyword.

In addition, in the case where the keyword outputted from the keyword extracting portion 302 is a keyword extracted from the server unit 4*b*, the position and time information acquiring portion 303 acquires position information expressed by the bulletin information from a position information recording portion on which POI (Point Of Interest) information concerning predetermined POIs are recorded. The POI information is information including at least one of information about facilities located at predetermined positions and information about the predetermined positions. That is, the server unit 4*b* is a Web server for providing blogs to viewers, <latitude> tags and <longitude> tag are not defined like the server unit 4*a* in the information recorded in the server unit 4*b*. For this reason, the position and time information acquiring portion 303 acquires the position information of the keyword expressed by the bulletin information from the position information recording portion.

In addition, the position and time information acquiring portion 303 acquires time information expressed by the bulletin information from a time information conversion rule recording portion on which time information is recorded. That is, since the server unit 4*b* is a Web server for providing blogs to viewers, <date and time> tags are not defined like the server unit 4*a* in the information recorded in the server unit 4*b*. For this reason, the position and time information acquiring portion 303 acquires the time information of the keyword expressed by the bulletin information from the time information conversion rule recording portion.

Figure 20:
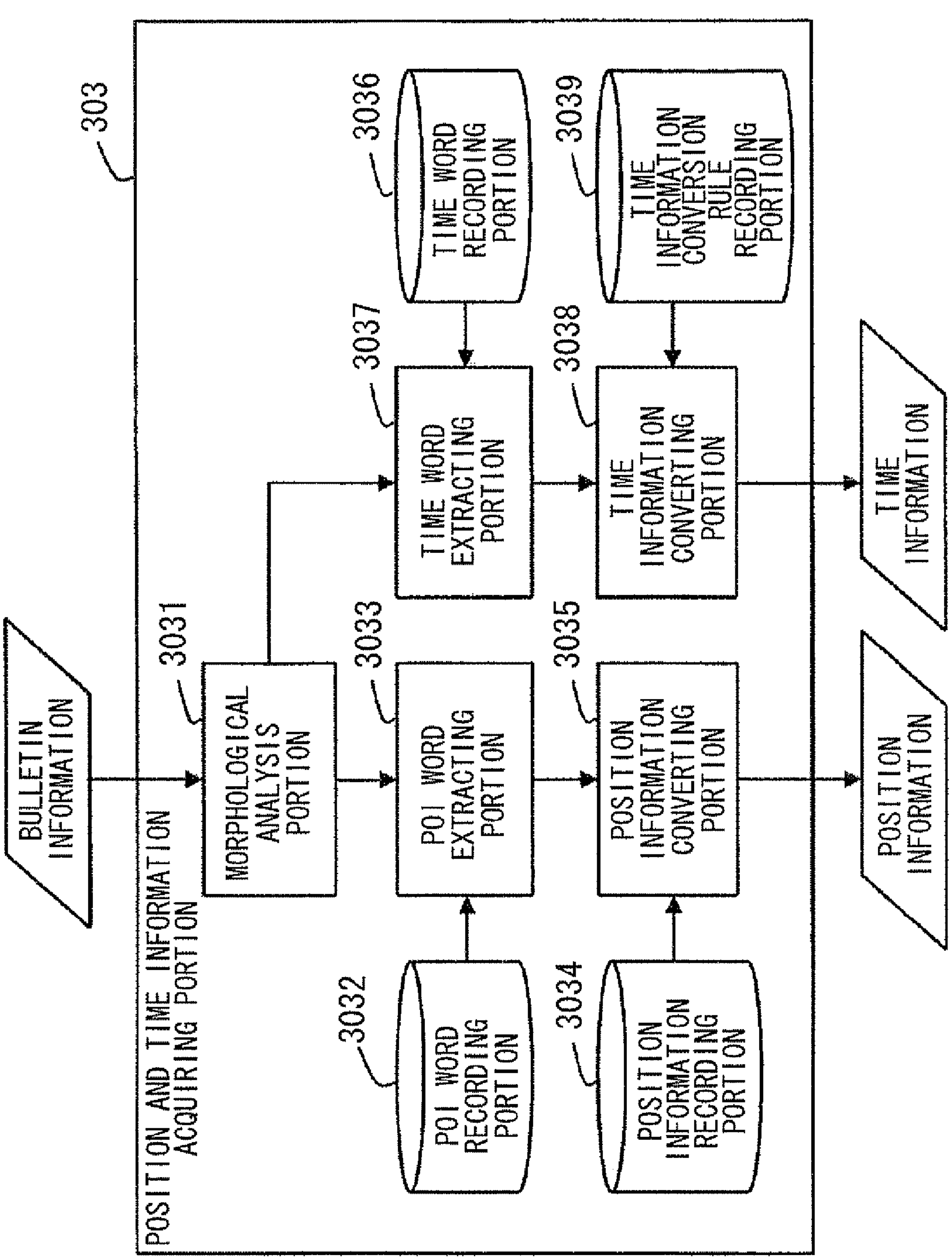
FIG. 20 illustrates the schematic configuration of a position and time information acquiring portion of an information processing apparatus in the communication system.

FIG. 20 illustrates the schematic configuration of the position and time information acquiring portion 303 in the case where position information of a keyword expressed by bulletin information is acquired from the position information recording portion and time information of the keyword expressed by the bulletin information is acquired from the time information conversion rule recording portion. As shown in FIG. 20, the position and time information acquiring portion 303 has a morphological analysis portion 3031, a POI word recording portion 3032, a POI word extracting portion 3033, a position information recording portion 3034, a position information converting portion 3035, a time word recording portion 3036, a time word extracting portion 3037, a time information conversion rule recording portion 3039 and a time information converting portion 3038.

The morphological analysis portion 3031 performs morphological analysis of the bulletin information outputted from the bulletin information acquiring portion 301. By the morphological analysis, the bulletin information is divided into a plurality of words. In addition, a part of speech of each of the plurality of divided words is discriminated. The POI word extracting portion 3033 extracts a POI word from the bulletin information divided into the plurality of words by the morphological analysis portion 3031, by referring to the POI word recording portion 3032. The POI word is a word about a facility or position. In this embodiment, assume that the POI word extracting portion 3033 has extracted a POI word expressing ‘Akashi’. The position information converting portion 3035 converts the POI word extracted by the POI word extracting portion 3033 into position information, by referring the position information recording portion 3034. In this embodiment, the position information converting portion 3034 converts the POI word expressing ‘Akashi’ into position information designating ‘34.64500, 134.99400’. The position information is designated by latitude information and longitude information. The position information converting portion 3035 outputs the converted position information as the position information of the keyword to the keyword registering portion 304.

The time word extracting portion 3037 extracts a time word from the bulletin information divided into the plurality of words by the morphological analysis portion 3031, by referring to the time word recording portion 3036. The time word is a word expressing time. For example, ‘morning’, ‘noon’, ‘night’, ‘lunch’, “cherry blossom-viewing picnic”, etc. are examples of the time word. The time information converting portion 3038 converts the time word extracted by the time word extracting portion 3037 into time information, by referring to the time information conversion rule recording portion 3039. In the case where, for example, the time word extracted by the time word extracting portion 3037 is ‘lunch’, the time information converting portion 3038 converts the time word ‘lunch’, for example, into time information ‘12:00’. The time information converting portion 303*i* outputs the converted time information as the time information of the keyword to the keyword registering portion 304.

In this manner, even when <latitude> tags, <longitude> tags, and <date and time> tags are not defined in the information recorded in the server unit 4*b*, the position and time information acquiring portion 303 can acquire the position information of the keyword and the time information of the keyword.

The keyword registering portion 304 is provided with a function of recording the keyword outputted from the keyword extracting portion 302 and the position information and time information outputted from the position and time information acquiring portion 303 into the keyword recording portion 305 while associating the keyword with the position information and time information, in addition to the function of the keyword registering portion 34 shown in FIG. 1.

Figure 21:
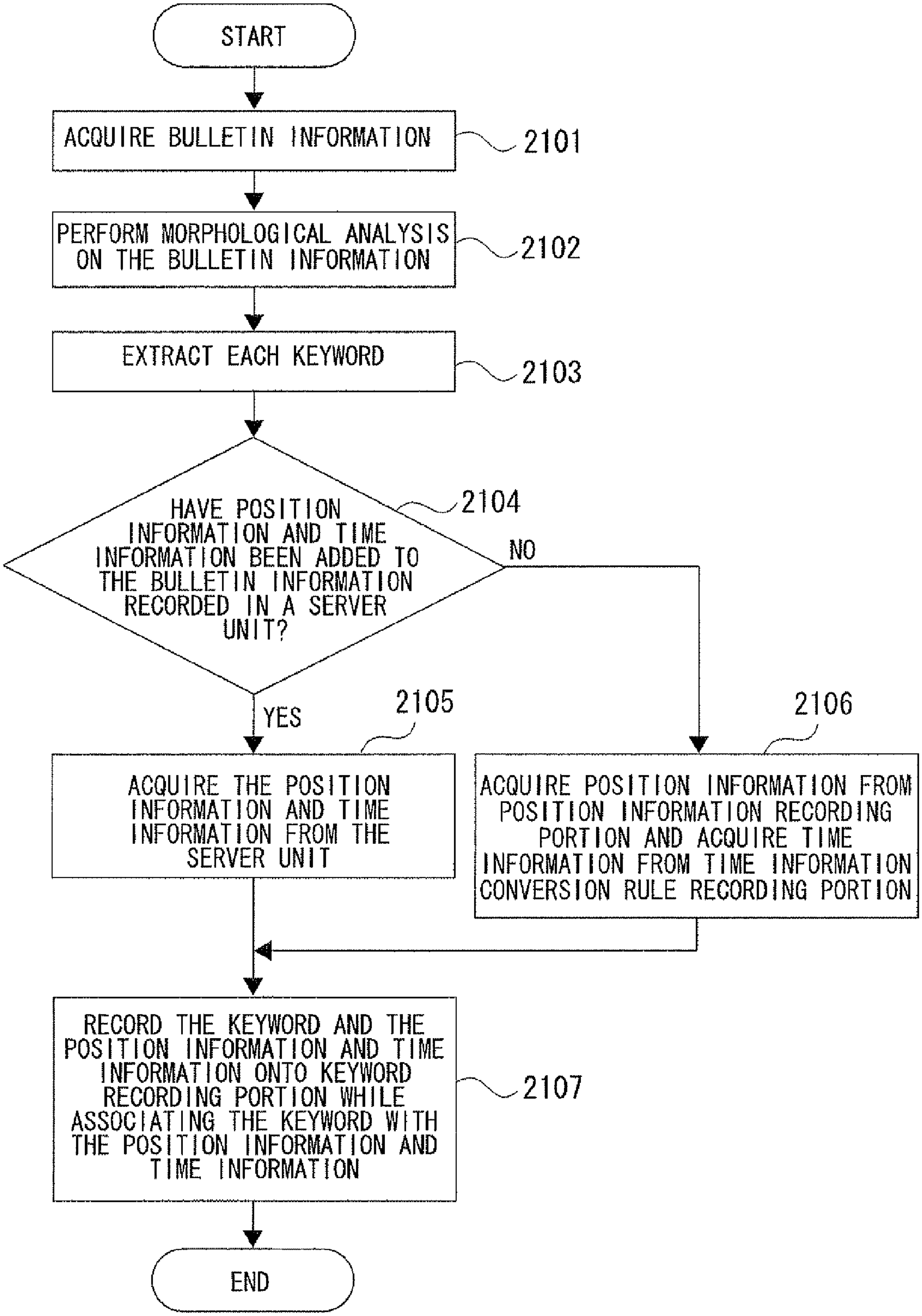
FIG. 21 illustrates an example of operation of the information processing apparatus in the case where bulletin information has been acquired from a server unit through a network.

FIG. 21 illustrates an example of operation of the information processing apparatus 300 in the case where bulletin information has been acquired from a server unit 4 through the network N. That is, as shown in FIG. 21, the bulletin information acquiring portion 301 acquires the bulletin information from the server unit 4 (Operation 2101). The keyword extracting portion 302 performs morphological analysis of the bulletin information acquired in Operation 2101 (Operation 2102). By the morphological analysis, the bulletin information is divided into a plurality of words. In addition, a part of speech of each of the divided words is discriminated. The keyword extracting portion 302 extracts each keyword from the plurality of divided words in accordance with a predetermined standard (Operation 2103). For example, the keyword extracting portion 302 extracts each keyword as a noun from the plurality of divided words, and further extracts keywords having modification relation with the extracted keyword.

The position and time information acquiring portion 303 judges whether or not position information and time information have been added to the bulletin information recorded in the server unit 4 (Operation 2104). When the position and time information acquiring portion 303 makes a decision that position information and time information have been added to the bulletin information recorded in the server unit 4 (YES in Operation 2104), the position and time information acquiring portion 303 acquires position information of the keyword and time information of the keyword from the server unit 4 (Operation 2105). On the other hand, when the position and time information acquiring portion 303 makes a decision that position information and time information have not been added to the bulletin information recorded in the server unit 4 (NO in Operation 2104), the position and time information acquiring portion 303 acquires position information of the keyword from the position information recording portion 3034 and acquires time information of the keyword from the time information conversion rule recording portion 3039 (Operation 2106).

The keyword registering portion 304 records the keyword extracted in Operation 2103 and the position information and time information acquired in Operation 2105 or Operation 2106 onto the keyword recording portion 35 while associating the extracted keyword with the acquired position information and time information (Operation 2107).

According to the information processing apparatus 300 as described above, the keyword extracting portion 302 divides bulletin information into a plurality of words and extracts each keyword from the plurality of divided words in accordance with a predetermined standard. In the case where position information and time information have been added to the bulletin information, the position and time information acquiring portion 303 acquires the position information and the time information from the server unit 4. On the other hand, in the case where position information and time information have not been added to the bulletin information, the position and time information acquiring portion 303 acquires position information expressed by the bulletin information from the position information recording portion 3034 and acquires time information expressed by the bulletin information from the time information conversion rule recording portion 3039. The keyword registering portion 304 records the keyword extracted by the keyword extracting portion 302 and the position information and time information acquired by the position and time information acquiring portion 303 onto the keyword recording portion 35 while associating the extracted keyword with the acquired position information and time information. That is, not only keywords extracted from word-of-mouth information inputted in the portable terminals 2 but in addition keywords extracted based on bulletin information recorded in the server units 4 are recorded on the keyword recording portion 35. In this manner, for example, keywords contained in word-of-mouth information becoming a topic of conversation currently in a certain region can be recorded onto the keyword recording portion 35 thoroughly.

Although example embodiments have been described in the case where keywords are read from the keyword recording portion based on the current position of a portable terminal, a word-of-mouth information entry screen is generated based on the read keywords, and screen data for the generated word-of-mouth information entry screen are transmitted to the portable terminal, the invention is not limited to this description. For example, a plurality of keywords and terminal environment information associated with each of the plurality of keywords may be recorded onto the keyword recording portion, so that keywords are read from the keyword recording portion based on terminal environment information of a portable terminal, a word-of-mouth information entry screen is generated based on the read keywords, and screen data for the generated word-of-mouth information entry screen are transmitted to the portable terminal. That is, the terminal environment information is information expressing an ambient environment of the portable terminal. The terminal environment information includes at least one of position information expressing the current position of the portable terminal, height information expressing the current height of the portable terminal, time information expressing the current time, physical information expressing natural phenomena (temperature, humidity, atmospheric pressure etc.) in the surroundings of the portable terminal, sound information expressing sounds in the surroundings of the portable terminal (environmental noise, human voice etc. in the surroundings of the terminal) and image information expressing images in the surroundings of the portable terminal (a scenery image, a human image, etc. in the surroundings of the terminal). In the case where, for example, image information expressing a 'flower' image in the surroundings of the portable terminal is contained in the terminal environment information, the keyword reading portion can read a keyword concerned with 'flower' from the keyword recording portion based on the image information. In addition, in the case where, for example, sound information expressing "the sound of bell-ringing crickets" in the surroundings of the portable terminal is contained in the terminal environment information, the keyword reading portion can read each keyword concerned with the sound of bell-ringing crickets from the keyword recording portion based on the sound information.

In addition, example embodiments have been described in the case where keywords are recorded in items "What?" and "How was it?" of the keyword recording portion so that selection fields corresponding to the items "What?" and "How was it?" are displayed on the display portion of the portable terminal, the invention is not limited to this description. For example, items such as "Who", "When", "Where" and "Why" may be provided in the keyword recording portion and keywords are recorded in the items, so that selection fields corresponding to the items "Who", "When", "Where" and "Why" can be displayed on the display portion of the portable terminal.

That is, the invention is not limited to the first and second example embodiments but various changes may be made within the scope of claims. That is, embodiments achieved by various combinations are within the scope of claims are also included in the technical range of the invention.

As described above, the information processing method, the information processing apparatus and the information processing program according to the invention have such an effect that keywords extracted from transmission information are recorded onto the keyword recording portion so that a plurality of keywords obtained from the keyword recording portion can be presented as selection candidates even to an ordinary terminal, for example, based on the current position of the terminal.

As described above, the invention is useful as an information processing method, an information processing apparatus or an information processing program by which keywords extracted from transmission information are recorded onto a keyword recording portion so that a plurality of keywords obtained from the keyword recording portion can be presented as selection candidates even to an ordinary terminal, for example, based on the current position of the terminal.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may in addition be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments any combinations of the described features, functions and/or operations can be provided.

The many features and advantages of the embodiments are apparent from the detailed specification and, thus, it is intended by the appended claims to cover all such features and advantages of the embodiments that fall within the true spirit and scope thereof Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An information processing method executed by a computer which communicates with terminals, the information processing method comprising the operations of:

a terminal environment acquiring operation acquiring, from a terminal into which input word-of-mouth transmission information will be input, terminal environment information that contains position information expressing a current position of the terminal, the terminal environment information is an information about an environment of the terminal;

a keyword reading operation reading a plurality of keywords associated with position information in a predetermined distance range from the current position of the terminal expressed by the position information of the acquired terminal environment information, the read plurality of keywords being recorded keywords in word-of-mouth transmission information which has been inputted through terminals and associated with terminal environment information of the terminals through which the word-of-mouth transmission information has been inputted;

a calculating operation calculating levels of importance of the read plurality of keywords respectively based on distances calculated based on the position information associated with the read plurality of keywords and the position information of the acquired terminal environment information and the respective numbers of appearances of the read plurality of keywords; and a keyword presenting operation presenting the read plurality of keywords as selection candidates to the terminal into which word-of-mouth transmission information will be input so that the keywords are presented in order of importance.

2. An information processing apparatus which communicates with terminals, the information processing apparatus comprising:

a memory; and a processor, coupled to the memory, configured to:

acquire, from a terminal into which word-of-mouth transmission information will be input, terminal environment information that contains position information expressing a current position of the terminal, the terminal environment information is an information about an environment of the terminal;

read a plurality of keywords associated with position information in a predetermined distance range from the current position of the terminal expressed by the position information of the acquired terminal environment information, the read plurality of keywords being recorded keywords in word-of-mouth transmission information which has been inputted through terminals and associated with terminal environment information of the terminals through which the word-of-mouth transmission information has been inputted;

calculate levels of importance for the read plurality of keywords respectively based on distances calculated based on the position information associated with the read plurality of keywords and the position information of the acquired terminal environment information and the respective numbers of appearances of the read plurality of keywords; and present the read plurality of keywords as selection candidates to the terminal into which word-of-mouth transmission information will be input so that the keywords are presented in order of importance.

3. The information processing apparatus according to claim 2, wherein the processor is further configured to:

acquire the word-of-mouth transmission information after being input in the terminal from the terminal and record the acquired word-of-mouth transmission information;

divide the recorded word-of-mouth transmission information into a plurality of words and extract keywords from the plurality of divided words; and record the extracted keywords and the acquired terminal environment information, while associating the extracted keywords with the acquired terminal environment information.

4. The information processing apparatus according to claim 3, wherein the processor is further configured to:

acquire bulletin information from a server unit;

acquire position information from the server unit when the position information has been added to the bulletin information and acquire position information designated by the bulletin information from a position information recording portion on which point information concerned with predetermined points has been recorded;

wherein the information processing apparatus communicates with the server unit which records the bulletin information posted by information providers;

wherein the terminal environment information contains position information expressing the current position of the terminal; and wherein the processor is configured to divide the acquired bulletin information into a plurality of words and extract keywords from the plurality of divided words in accordance with a predetermined standard;

wherein the processor is further configured to record the extracted keywords and the acquired position information while associating the extracted keywords with the acquired position information.

5. The information processing apparatus according to claim 2, wherein:

the terminal environment information contains time information expressing the current time; and the processor is further configured to read a plurality of keywords which are associated with the position information in the predetermined distance range from the current position of the terminal expressed by the position information of the acquired terminal environment information and which are associated with time information which is the same time type information as that shown by the time information of the acquired terminal environment information, from the recorded plurality of keywords.

6. The information processing apparatus according to claim 2, wherein the processor is further configured to:

record profile information expressing tastes of users of the terminals and history information expressing histories of word-of-mouth transmission information acquired from the terminals;

calculate levels of importance for keywords respectively based on the distances calculated based on the position information associated with the read plurality of keywords and the position information of the acquired terminal environment information, the respective numbers of appearances of the read plurality of keywords, and similarities between the read plurality of keywords and the profile information and history information.

7. The information processing apparatus according to claim 2, wherein the processor is further configured to:

calculate a moving velocity of the terminal based on the position information and time information acquired at the last time and the position information and time information acquired at this time in such a manner that the position information expressing the current position of the terminal and the time information expressing the current time are acquired at intervals of a predetermined time; and instruct to widen the predetermined distance range for reading a plurality of keywords when the moving velocity of the terminal is not lower than a threshold.

8. The information processing apparatus according to claim 2, wherein the processor is further configured to:

calculate accuracy information expressing measurement accuracy of the position information expressing the current position of the terminal; and instruct to widen the predetermined distance range for reading a plurality of keywords when the measurement accuracy expressed by the accuracy information is lower than a threshold.

9. The information processing apparatus according to claim 2, further comprising:

a cache memory which is accessed more speedily than a keyword recording portion on which the plurality of keywords are recorded, and on which a plurality of keywords rearranged in order of importance are recorded; wherein:

the processor is configured to read a plurality of keywords from the cache memory instead of the keyword recording portion when a distance calculated based on the position information of the acquired terminal environment information and the position information of the terminal environment information acquired in the past is in a predetermined distance range.

10. A computer-readable storage medium having an information processing program recorded thereon so that processing written in the information processing program is executed by a computer communicable with terminals, the processing comprising:

a terminal environment acquiring process to acquire, from a terminal into which word-of-mouth transmission information will be input, terminal environment information that contains position information expressing a current position of the terminal, the terminal environment information is information about an environment of the terminal;

a keyword reading process to read a plurality of keywords associated with position information in a predetermined distance range from the current position of the terminal expressed by the position information of the acquired terminal environment information, the read plurality of keywords being recorded keywords in word-of-mouth transmission information which has been inputted through terminals and associated with terminal environment information of the terminals through which the word-of-mouth transmission information has been inputted;

a calculating process to calculate levels of importance for the read plurality of keywords respectively based on distances calculated based on the position information associated with the read plurality of keywords and the position information of the acquired terminal environment information and the respective numbers of appearances of the read plurality of keywords; and a keyword presenting process to present the read plurality of keywords as selection candidates to the terminal into which word-of-mouth transmission information will be input so that the keywords are presented in order of importance.

11. A method comprising:

storing keywords in word-of-mouth transmission information which has been inputted through terminals and respectively associated with terminal environment information of the terminals through which the word-of-mouth transmission information has been inputted;

acquiring, from a respective terminal into which word-of-mouth transmission information will be input by a user of the respective terminal, terminal environment information that contains position information expressing a current position of the respective terminal;

reading, from the stored keywords, a plurality of keywords associated with position information in a predetermined distance range from the current position of the respective terminal expressed by the position information of the acquired terminal environment information;

calculating levels of importance for the read plurality of keywords respectively based on distances calculated based on the position information associated with the read plurality of keywords and the position information of the acquired terminal environment information and the respective numbers of appearances of the read plurality of keywords; and displaying the read plurality of keywords on the respective terminal as selection candidates by the user for the word-of-mouth transmission information that will be input so that the keywords are displayed in order of importance.

* * * * *

UNITED STATES PATENT AND TRADEMARK OFFICE

CERTIFICATE OF CORRECTION

PATENT NO. : 8,818,997 B2
APPLICATION NO. : 12/192567
DATED : August 26, 2014
INVENTOR(S) : Tatsuro Matsumoto et al.

It is certified that error appears in the above-identified patent and that said Letters Patent is hereby corrected as shown below:

In the specification

Column 1, line 9, Delete “to f” and insert -- to --, therefor.

Signed and Sealed this
Eighteenth Day of November, 2014

Michelle K. Lee
*Deputy Director of the United States Patent and Trademark Office*